United States Patent [19]

Stover

[11] 4,142,069

[45] Feb. 27, 1979

[54] TIME REFERENCE DISTRIBUTION TECHNIQUE

[75] Inventor: Harris A. Stover, Vienna, Va.

[73] Assignee: The United States of America as represented by the Secretary of the Army, Washington, D.C.

[21] Appl. No.: 808,010

[22] Filed: Jun. 20, 1977

[51] Int. Cl.² ............................................. H04J 3/06
[52] U.S. Cl. .............................................. 179/15 BS
[58] Field of Search ...................... 179/15 BS, 15 BA; 178/69.1; 340/347.8 Y

[56] References Cited

U.S. PATENT DOCUMENTS

| | | | |
|---|---|---|---|
| 2,986,723 | 5/1961 | Darwin | 179/15 BS |
| 3,050,586 | 8/1962 | Runyon | 179/15 BS |
| 3,453,594 | 7/1969 | Jarvis | 179/15 BS |
| 4,042,781 | 8/1977 | Dragotinov | 179/15 BS |

Primary Examiner—David L. Stewart
Attorney, Agent, or Firm—William G. Gapcynski; Werten F. W. Bellamy; Sherman D. Winters

[57] ABSTRACT

A method and apparatus for distributing an accurate time reference to numerous locations, such as to the nodes of a digital communications network which can also be used to synchronize the network, which method and apparatus entails the functions of measurement of the local clock's time error, assignment of weighting factors to the paths over which the time reference is distributed through the network, and correction of the time error of the local clock, wherein the first two functions are not affected by the correction of the clock error at any other mode and wherein the time reference distribution system does not contain any closed (reentrant) distribution paths.

26 Claims, 9 Drawing Figures

TIME REFERENCE DISTRIBUTION TECHNIQUE

BACKGROUND OF THE INVENTION

The present state of technology indicates that the future will provide numerous situations wherein it will be desirable to distribute an accurate time reference to numerous locations. It is further obvious that any technique that satisfies one application of a distributed time reference may also be useful for the others. An accurate time reference distributed to the nodes of a digital communications network obviously can be applied to the synchronization of that network, and the network could provide such a distribution. In addition to digital communications network synchronization, accurate time distributed through such a network may have other applications both within the network and for network subscribers.

In an early time reference distribution concept (DCASEP TC 39-73, "Time Reference Concept for the Timing and Synchronization of the Digital DCS", H. A. Stover, July, 1973 and H. A. Stover, "A Time Reference Distribution Concept for a Time Division Communications Network", Proceedings of the Fifth Annual NASA, Department of Defense Precise Time and Time Interval (PTTI) Planning Meeting, NASA, Goddard Space Flight Center, Greenbelt, Md. (Dec. 4–6, 1973), the internodal transmission time was removed in the transfer of the time reference from one node to another, the time reference from the highest ranking node in the network was supplied to all nodes over the best available path to each node. This procedure avoided feedback paths that could potentially contribute to instability. Later, capability was added to permit the distribution of the time reference through several tandem nodes to be indepedent from the actual correction of the clocks at those nodes (H. A. Stover, "Coordinated Universal Time (UTC) as a Timing Basis for a Digital Communications Network", EASCON 1974 Record). However, that technique of selecting the best path to the highest ranking node failed to use much of the available information that could provide a more accurate and more stable (low phase fluctuation) system. The present invention relates, inter alia, to a technique which does make good use of this additional information.

Although the discussion here is applied to the use of accurate time for synchronizing a large switched digital communications network, availability of accurate time as provided by distributing an accurate time reference through such a network could have many other applications. For example, if a radio signal with any identifiable characteristic which is not ambiguous in time is received at three noncolinear locations, its orgin relative to the receiver locations can be determined by comparing the times of signal reception.

The communication of information in digital form is expanding very rapidly. Part of this rapid expansion can be attributed to communications with digital computers, but perhaps even greater significance belongs to the advantages that can be provided to many types of communications for a broad range of users. The ability to regenerate nearly noise free signals whenever they are retransmitted is important, as is the use of error correcting codes for further error reduction. Error detection can provide confidence that the received message is an accurate copy of the one transmitted, and digital techniques are particularly useful for those signals that must be encrypted.

However, digital communications networks employing time division multiplexers have a timing (synchronization) requirement that did not exist in analog communications networks. For every output time slot of the time division multiplexer, the assigned bit from the appropriate input bit stream must be available when it is needed. Otherwise a bit or bits might be lost which could sometimes result in further disorder. In a large digital communications network, bits assigned to adjacent multiplexer time slots might originate in widely separated geographical locations. In a switched digital network, time slot assignments are changed frequently so that bits presently assigned to particular time slots originate in locations entirely different from those previously assigned to corresponding (same location in the frame) time slots. In an operating digital communications system, the probability is very small that all bits from several different neighboring nodes will arrive at the exact moments when they are needed to fill their assigned time slots. This is because signal transit times between nodes will fluctuate, and clocks controlling transmission from different nodes probably are not perfectly synchronized. To accommodate the variation in arrival times of bits from different nodes, a variable storage buffer can be provided for each received bit stream to serve as a reservoir in which bits are temporarily stored until they are needed. The local nodal clock controls the release of bits from the buffer so that they coincide with their assigned time slots. In order to assure that the buffers will neither overflow nor empty, causing disorder, either clocks at all nodes must be kept within some acceptable phase tolerance of one another or the communications traffic must be interrupted occasionally to reset the buffers.

There are many methods of providing the necessary clock synchronization (J. W. Pan, "Synchronizing and Multiplexing in a Digital Communications Network", Proc IEEE, Vol. 60, No. 5, (May 1976) pp 594–601, and Defense Communications Engineering Center Technical Report 43–75, "Communications Network Timing", H. A. Stover, September, 1975). These include such techniques as pulse stuffing, mutual synchronization, precise independent clocks, external time references, master slave, and internal time reference distribution. It is obvious that if accurate time were available at each node, it would be useful for network synchronization. Two of these techniques attempt to set all network nodal clocks (or at least those at major nodes) to the same time. The external time reference technique attempts to set them all to a standard time supplied by some reference signal external to the network, e.g., a Loran-C navigation system signal. The time reference distribution technique attempts to set all network clocks to the same time as a master clock within the network. Loran-C is referenced to Coordinated Universal Time (UTC) (J. F. Roeber, Jr., "Loran-C Expansion: Impact on Precise Time/Time Interval", Proceedings of the Sixth Annual Precise Time and Time Interval (PTTI) Planning Meeting, Washington, D.C., Dec. 3–5, 1974, pp 305–318.), but it does not have world-wide coverage. If the master node of a communications network employing a time reference distribution technique is also referenced to UTC (H. A. Stover, "Coordinated Universal Time (UTC) as a Timing Basis for a Digital Communications Network", EASCON 1974 Record), the communications network and the navigation network could mutually support one another to provide a very dependable timing system.

In the time reference distribution technique as previously described, all nodes are kept within a specified time (phase) tolerance of the master node. Nodal clocks run independently most of the time but are occasionally updated. Time reference information is transferred between all connected nodes with the effects of signal transit time removed, but the time reference used at any node is that which comes over the best path to the highest ranking node. This restriction to the best path from the highest ranking node unnecessarily limits the technique as will become evident later. Replacing this best path approach with a better approach will be shown to provide considerable improvement.

There are three major functions related to time reference distribution through a network: (1) measurement of the local clock's time error, (2) selection and/or weighting of the paths over which the time reference is distributed through the network, and (3) correction of the time error of the local clock. For several reasons, it is important that the first two functions should not be affected by the correction of the clock error at any other node. For example, there should be freedom to adapt the frequency and rate of making corrections to the clock at another node so as to optimize other system paramaters without significantly influencing the measurement of the time error in the local clock or the selection or weighting of time reference distribution paths.

It is also desirable that the time reference distribution system not contain any closed distribution paths (those that re-enter themselves). Such paths can contribute to system instability and inaccuracy. This is particularly true for a system spread over a wide geographical area and subject to varying signal propagation conditions because of the large signal delays involved.

Some procedures could be expected to be the same for all three of the time reference distribution techniques (the one using the best path from the master, and also the other time reference distribution techniques combining information from multiple paths). Methods for measuring the time difference between clocks of directly connected (neighboring) nodes can be the same for many different approaches and a method which can be used for several of them is discussed next.

All digital communications systems, even those consisting of only a single link, need some type of link synchronization in order to properly identify and assign all received bits. One link synchronization method periodically inserts a synchronization code in the data stream of the transmission link. A link synchronization code is normally chosen so that it is unlikely to occur as a part of the data sequence. This requirement can be satisfied by transmitting the synchronization code with greater regularity than it would randomly occur. Barker sequences (Barker, R. H., "Group Synchronization of Binary Digital Systems", Communication Theory, W. Jackson, ed. New York, Academic Press Inc. 1953, 273-87) are often used for this purpose because they do not strongly correlate with phase shifted versions of themselves.

The synchronization codes can be used to break the data stream into frames of various levels, e.g., frames, subframes, superframes, etc. A basic frame might use the same repetitive code pattern most of the time, but one out of a specified multiple of these frames can periodically have its code pattern altered, e.g., inverted, to identify a superframe period. Extensions of this technique will allow the frame ambiguity period to be made as long as desired. The frame synchronization codes, used to enable receivers to synchronize with the received signals, can also be used for comparing time differences between nodal clocks at the two ends of a duplex transmission link. The nodal clock at each transmitter can be used to control the time of transmission of the synchronization code. The time of reception of the synchronization code can be measured relative to the nodal clock at the receiver. Neglecting noise (which includes instrumentation errors), the measured time difference between the received synchronization code and the nodal clock is due to two sources: the transit time of the signal, and the difference between the two clocks.

If each node transmits its measurement to the node at the other end of the link, both measurements are available at both ends of the link and the time difference between the two clocks can be determined. Let $T_A$ be the time of the clock at node A, $T_B$ be the time of the clock at node B, $D_{AB}$ be the signal transit time from node A to node B, and $D_{BA}$ the signal transit time from node B to node A. Then the time difference measured at node A between the synchronization code received from node B and the local clock at node A is given by Equation 1:

$$\Delta T_A = T_A - (T_B - D_{BA}) \qquad (1)$$

The time difference measured at node B between the synchronization code received from node A and the local clock at node B is given by Equation 2:

$$\Delta T_B = T_B - (T_A - D_{AB}) \qquad (2)$$

Solving Equations (1) and (2) for $T_B - T_A$ gives Equation 3:

$$T_B - T_A = \frac{\Delta T_B - \Delta T_A}{2} + \frac{D_{BA} - D_{AB}}{2} \qquad (3)$$

When the transit times in the two directions are the same, ($D_{BA} = D_{AB}$), they cancel, giving the time difference between the two nodal clocks with the transmission transit times removed. For most applications in high capacity transmission links, this difference in transmission time in the two directions will be very small and could be considered negligible. (If desired, its initial value can be measured by using a portable clock at the time of installation.) However, a statistical estimate of this ($D_{BA} - D_{AB}$) difference can be useful for a time reference distribution system which combines timing information from multiple paths, and it will be discussed further later.

If Equation (1) and Equation (2) are added, the round trip signal transit time is obtained as given in Equation 4.

$$D_{AB} + D_{BA} = \Delta T_A + \Delta T_B \qquad (4)$$

Although this discussion has assumed that the frame synchronization code is used for time comparison of neighboring nodal clocks, under some circumstances it might be preferable to use low-level spread spectrum signals or some other special type of modulation which can be superimposed on the message traffic without introducing interference.

SUMMARY OF THE INVENTION

This invention relates to techniques for distributing time reference information through a network and doing it in ways which avoid feedback paths that could potentially contribute to system instability. It will be shown that the time reference distribution techniques of the invention make good use of time reference information passed over multiple paths, provide significant increases in accuracy over the previous technique which used only the best path, and that they do it with essentially the same facilities as the older techniques.

In the time reference distribution (TRD) techniques to be disclosed here, timing is exchanged between neighboring nodes, but no node is required to exchange timing information with any node other than its own immediate neighbors. The information that is exchanged is used to measure the difference between the clocks at neighboring nodes and to determine how to use this measurement for measuring the error in the local clock.

Every clock in the network is given a unique rank which is used to determine the master, and also to select alternate masters to be used when the highest ranking clocks are not available. Nodes having more than one clock in order to provide redundance for reliability purposes, are said to have a rank equal to the rank of the clock in use at the moment. Various factors can enter into the assignment of a particular rank to a clock. They might include the availability of an accurate time reference external to the network, the quality of the clock itself, and the quality of transmission links between the node and neighboring nodes. The highest ranking clock in such a network located in the U.S.A. might be a cesium beam frequency standard that can be accurately referenced to the Naval Observatory.

According to the invention, different time reference distribution (TRD) techniques are possible. They may differ in many ways, e.g., clock comparison techniques, the information that is exchanged between nodes, and the way this information is used. Three different techniques will be described here and their relative accuracies will be illustrated in an example network.

OBJECTS OF THE INVENTION

It is accordingly an object of the present invention to provide a method and apparatus for distributing an accurate time reference to numerous locations.

It is another object of the invention to provide a method and apparatus for distributing an accurate time reference to the nodes of a digital communications network which can also be applied to the synchronization of the network.

It is yet another object of the present invention to provide a method and apparatus for distributing an accurate time reference to numerous locations wherein the time reference distribution system does not contain any closed distribution paths.

It is a further object of the present invention to provide a method and apparatus for distributing an accurate time reference to numerous locations entailing three major functions: (1) measurement of the local clock's time error, (2) selection and/or weighting of the paths over which the time reference is distributed through the network, and (3) correction of the time error of the local clock, wherein the first two functions are not affected by the correction of the clock error at any other node.

It is yet another object of the present invention to provide a method and apparatus for distributing time reference information through a network in ways which avoid feedback paths that could potentially contribute to system instability while at the same time making good use of time reference information passed over multiple paths, providing significant increases in accuracy over the previous techniques which used only the best path, and accomplishing this with essentially the same facilities as the older techniques.

It is a further object of the present invention to provide a method and apparatus for time reference distribution wherein timing information is exchanged between neighboring nodes but no node is required to exchange timing information with any node other than its own immediate neighbors.

It is still a further object of the present invention to provide methods and techniques of the foregoing type wherein every clock in the network is given a unique rank which is used to determine the master, and also to select alternate masters to be used when the highest ranking clocks are not available.

These and further objects and advantages of the invention will become more apparent upon reference to the following specification, claims and drawings.

DESCRIPTION OF THE PREFERRED EMBODIMENTS

Figure 1:
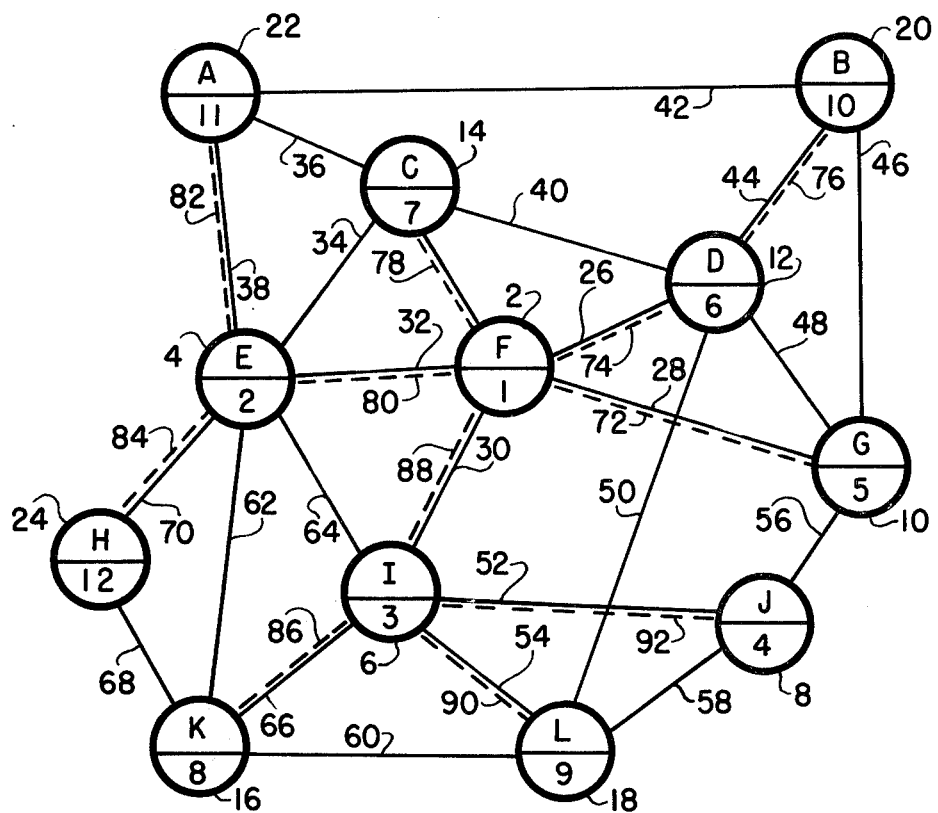
FIG. 1 is a diagrammatic representation of a 12 node network utilizing the time reference distribution techniques of the invention.
Figure 2:
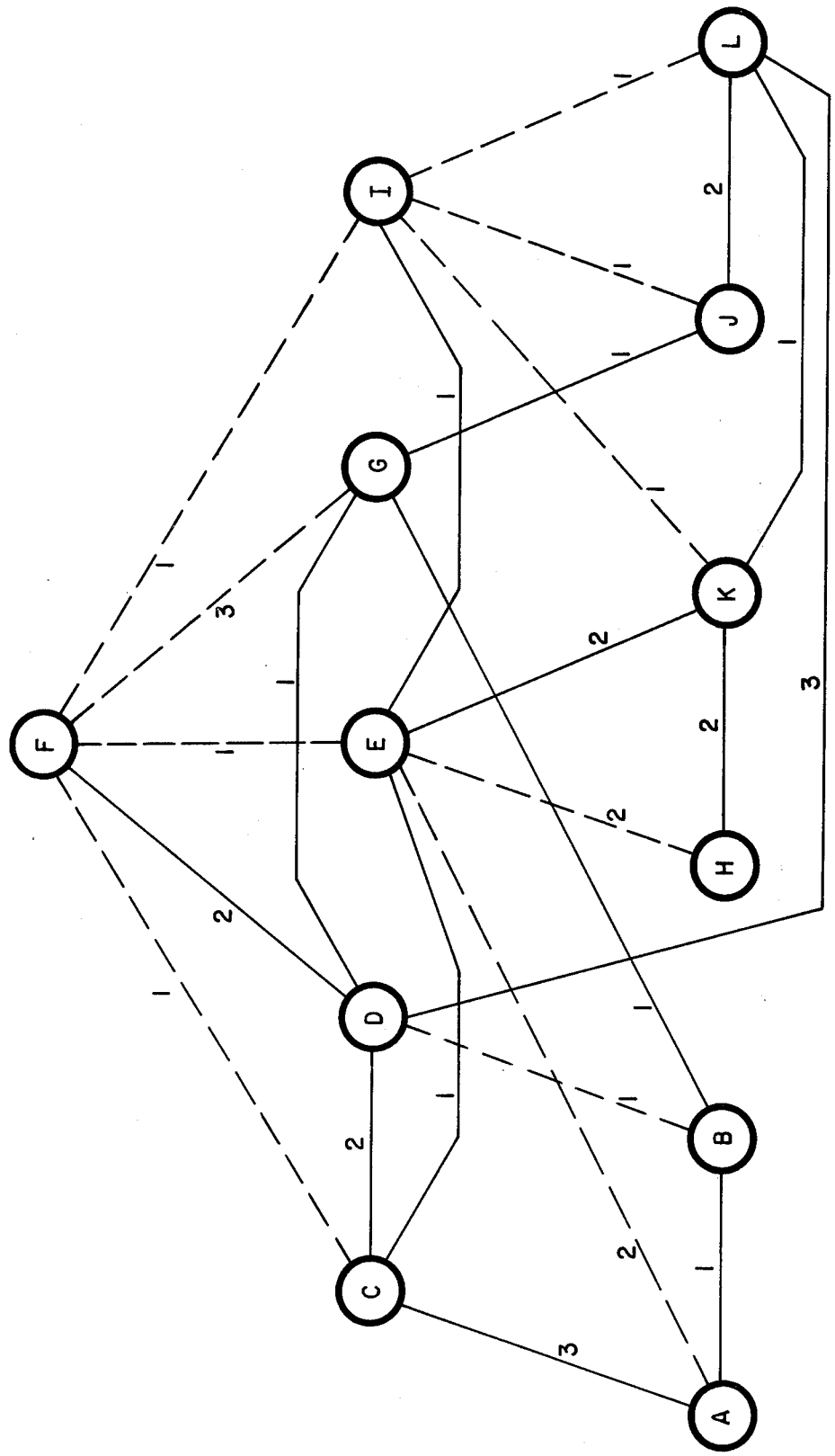
FIG. 2 shows the natural hierarchy of the network of FIG. 1 with node F as the master node.
Figure 3:
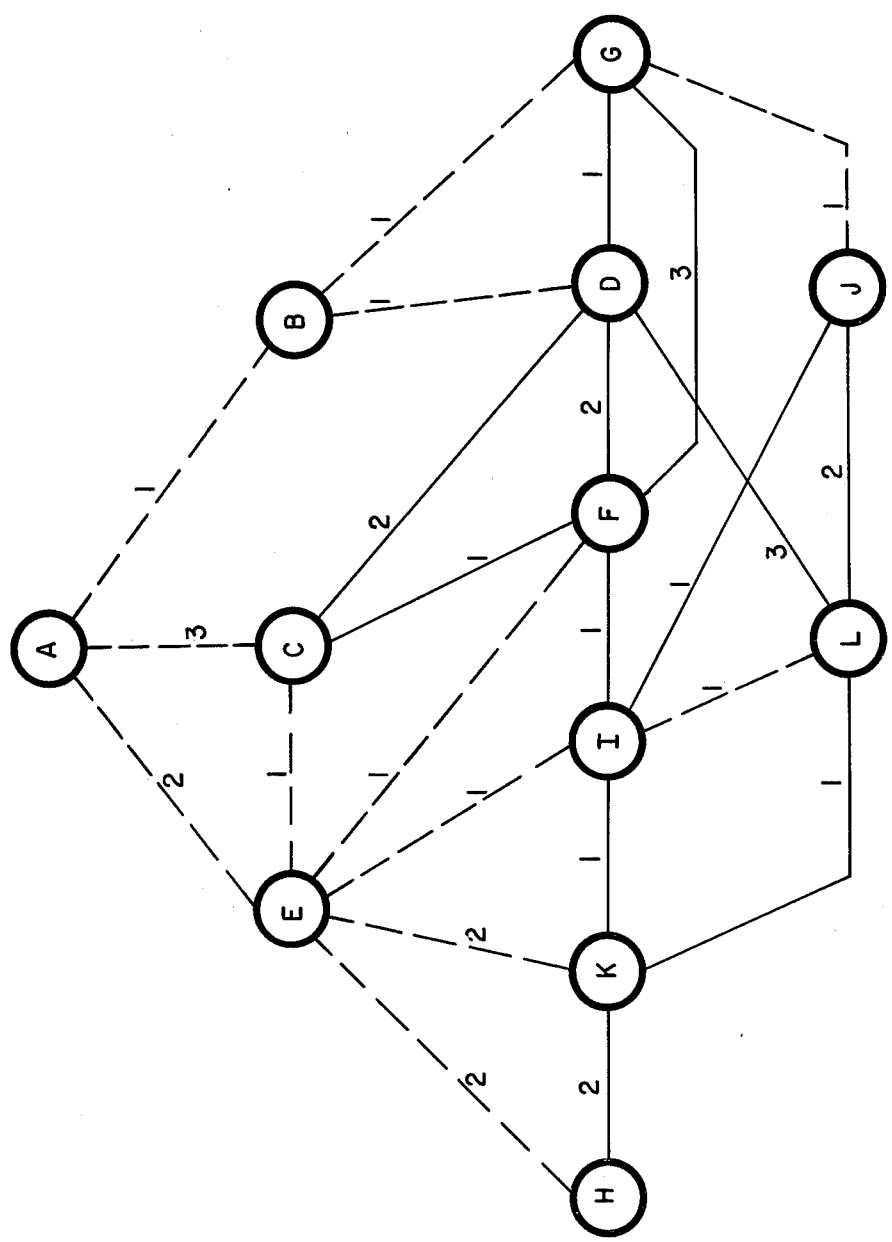
FIG. 3 shows the natural hierarchy of the network of FIG. 1 with node A as the master node.

Referring to FIG. 1, the internodal connections of this digital communications network, as shown by the straight lines, represent a portion of the total possible internodal connections for a 12 node network. If any single node of such a network is selected as the master for the entire network, for timing purposes, the internodal links of the network cause the nodes of the network to fall into a natural hierarchy with the selected master at the highest level of the hierarchy. The second level of the hierarchy comprises all nodes connected to the master; the third level consists of all nodes connected to the second level but not to a level higher than second; etc. FIG. 2 shows this hierarchy for the network of FIG. 1 when node F is selected as the master, while FIG. 3 shows the hierarchy when node A is chosen as the master.

Each node is assigned a unique rank to be used in determining the order of succession to master and to help resolve ambiguities that could occur. Each transmission link is assigned a demerit value and each node chooses to receive its time reference through the particular neighbor that will provide the lowest demerit path between the local node and the master. The numbers next to the individual links of FIGS. 2 and 3 represent the demerit values for the individual transmission links; the best (lowest demerit) path from each node to the master is shown by the dashed lines in these figures. The rank and demerit values are assigned by the system designer on the basis of engineering consideration as is well known.

It is obvious that for many nodes there are a large number of possible paths between that particular node and the master. In FIG. 2, some of the paths from the master to node I for which there is no backtracking through levels of the hierarchy include: FIL, FIJL, FGJL, FEKL, FEHKL, FDL, FDGJL, FCEIJL, and FCDGJL, among others. By combining timing information passed over these various paths, it is possible to provide greater timing accuracy. Also, the network does not have to be reorganized following some types of failure that would require reorganization if only the best path to each node were used for the time reference distribution. However, for effective use of this information from any different paths a set of rules or procedures is needed. Three types of procedures are described below.

Some basic considerations that influence the choice of timing information to be transferred within the network and the selection of a particular set of rules for using this information will be discussed prior to the presentation of a suitable set of rules.

Rather than transferring all timing information to a single location where a common processor can be used for all timing information from all nodes, it is much simpler and more reliable if each node of the network can receive all required timing information from its neighbors (directly connected nodes) and use this information in a local processor (microprocessor). In a network employing a centralized processor, the common processor becomes a point of high vulnerability that reduces network reliability and survivability; and the efficiency of utilization of transmission facilities is reduced because of the large amount of information that must be transferred to and from the central processor in order to serve nodes throughout the network. Therefore, it is desirable that all timing information required by any node either be stored at that node or be supplied by its neighbors without any need for any node to communicate with nodes more distant than its own neighbors.

Figure 5:
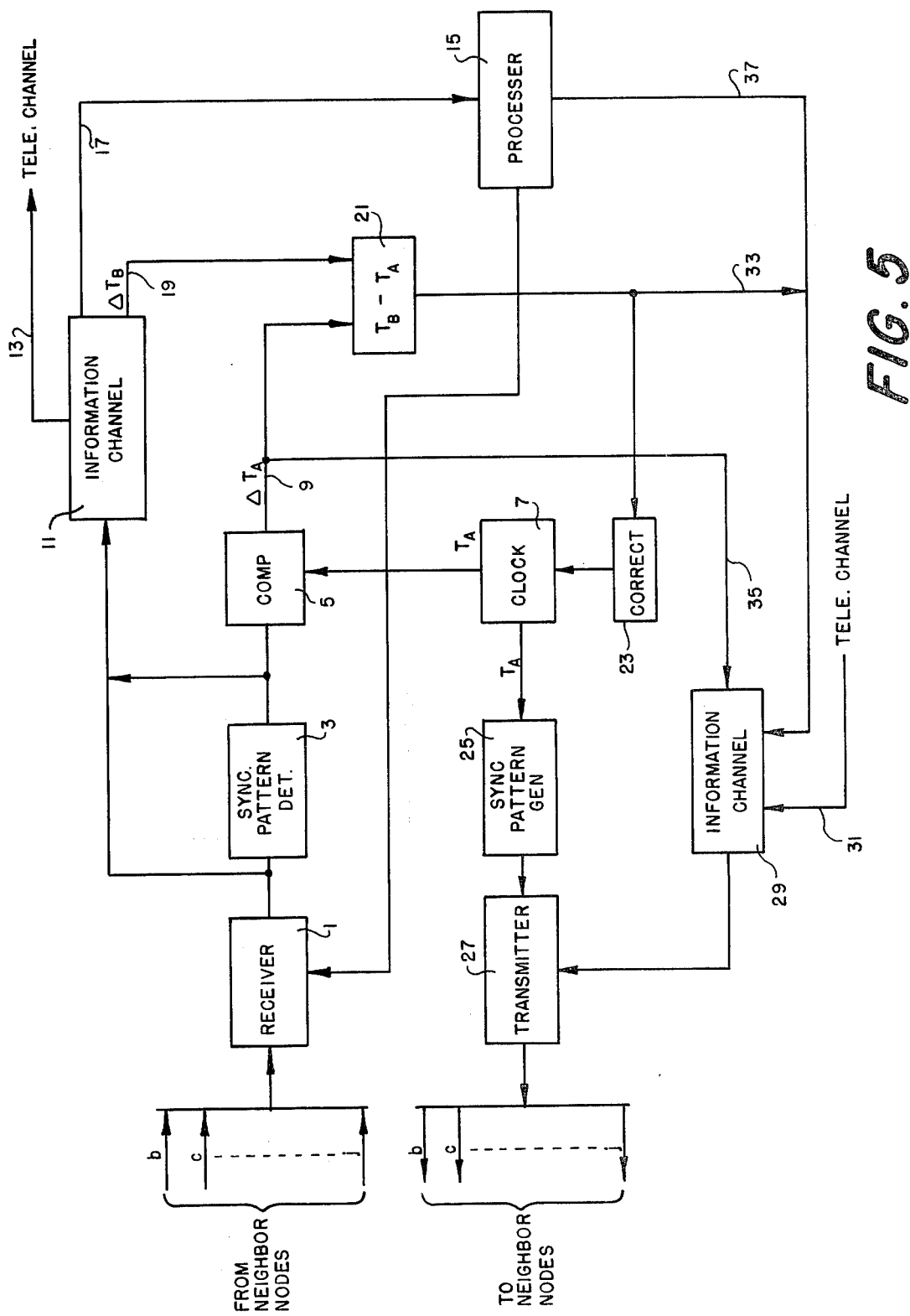
FIG. 5 is an electrical block diagram of a typical node employing the distribution techniques of this invention.

FIG. 5 shows a typical node A having its own local processor for storing and operating on information required by that node to establish the accuracy of its clock relative to the system master clock. A receiver 1 receives information from each of neighbor nodes B, C, . . . J. A synchronizing pattern detector 3 coupled to the output of the receiver 1 detects a synchronizing code which identifies input signals containing clock and related time reference input information from the neighbor nodes. Among the information received from a neighboring node, for example node B, is the time $T_B$ of the clock at node B, delayed by the signal transit time $D_{BA}$ from node B to node A. This information is compared in a comparator 5 with the time $T_A$ from clock 7 to obtain the time difference measured at node A between the synchronization code received from node B and the local clock at node A (Equation 1). This time difference $T_A$ appears on comparator output line 9.

Neighbor node information received by receiver 1 is supplied to a logic block 11 which separates the several multiplexed information signals transmitted over a given channel. Information in the form of, for example, audio and/or video information is obtained at output 13; node status information, such as clock error, clock rank, transmission path demerit rating, etc., which is passed from each node to its neighbors for time reference distribution purposes is separated out by logic 11 and supplied to a local processor 15 on line 17. Node B also transmits the time difference measured at node B between the synchronization code received from node A and the local clock at node B (Equation 2); this information is separated out in logic 11 and transmitted on line 19 to a time difference measuring circuit 21 which calculates the time difference between the clocks at nodes A and B (Equation 3). This time difference is supplied to a correction circuit 23 to adjust clock 7 as necessary.

Each node also has a synchronizing code pattern generator 25 which generates a code to identify clock signals $T_A$ that are transmitted from node A to each of its neighbor nodes by transmitter 27. A multiplexer 29 combines the audio/video channel information (line 31) with time difference information $T_B - T_A$ (line 33), measured time difference $\Delta T_A$ (line 35 and local node status information stored in processor 15 (line 37). The output of logic 29 is supplied to transmitter 27 for transmission to the neighbor nodes B, C, . . . J.

In the time reference distribution techniques of this invention control signals are generated by the local processor 15 to select information from only certain neighbor nodes (as will be discussed in more detail below) for use in establishing a time reference for the local clock 7.

Three time reference distribution techniques are described below which operate on information supplied by a node to each of its neighbors according to specified rules of operation. Each local processor 15 is programmed by any well-known programming technique to apply the rules of the technique in use to the information transmitted to a node by each of its neighbors.

Time Reference Distribution Via Best Path (TRDVBP)

In this Time Reference Distribution Technique, a time reference is distributed from the highest ranking node in the network to all other nodes over the best available path to each node, and the network is easily reorganized to accommodate failures. Table 1 lists information transmitted by each node to its immediate neighbors for this Time Reference Distribution Technique.

TABLE 1

INFORMATION PASSED FROM EACH NODE TO ITS NEIGHBORS FOR TIME REFERENCE DISTRIBUTION VIA BEST AVAILABLE PATH (TRDVBP)

1. The time difference between the local clock and the clock at the other end of the link as observed at the local clock. (This time difference includes signal transit time).
2. The measured by uncorrected error in the local clock relative to its master reference.
3. The rank of the clock used as the master reference for the local clock.

4. The demerit rating of the transmission path over which the time reference is passed from the master reference clock to the local clock.

5. The rank $R_L$ of the local clock.

6. Delay interval information.

Every node uses a set of rules to employ this information, as received from its neighbors, so as to provide the desired time reference distribution.

Rule 1. A node initially entering the network will use its own clock as its only time reference until a better time reference can be selected.

Rule 2. Whenever a transmission link or neighboring node used for immediate time reference (part of a path to the master time reference) fails, the node will temporarily use its own clock as its only time reference until an alternate selection is made.

Rule 3. If a neighboring node being used as the immediate reference should have a change in its master to one of lower rank, the local node will temporarily reference its own clock until an alternate selection (which could be the same neighbor again) is made.

Rule 4. The third item of information in Table 1, as received, provides the rank of the master time reference used by each neighboring node. The time reference for the local clock is taken from the neighboring node which uses the highest ranking node as its master reference. However, if the local clock outranks the others, the local clock (perhaps referencing an external time standard if it is available) is used as the master reference. If any two links come from nodes referencing the same highest ranking master clock, the criterion is inconclusive and Rule 5 is applied.

Rule 5. The fourth item of information in Table 1 provides information about the demerit rating of the path from each neighboring node to the master reference. Combining this information with the known demerit of the path from the local node to the neighbor gives the overall demerit rating for paths to the master reference through each link entering the local node. When the test of Rule 4 is inconclusive because more than one of the immediate time references come from neighboring nodes ultimately referencing the same highest ranking clock, use this path demerit information to select from among them the time reference that comes over the transmission path with the lowest demerit, i.e., the one with the best time transfer capability. This prevents closed feedback loops from forming because such paths would have greater demerit. If two or more of these time references traverse paths with the same lowest demerit rating, this test will also be inconclusive and Rule 6 is applied.

Rule 6. The fifth item of information in Table 1 provides the rank of the clock at each neighboring node. When the tests of Rules 4 and 5 are both inconclusive, this fifth item of information from Table 1 is used to select from among those links with master time reference coming from the same highest ranking clock over paths with the same lowest demerit rating, that one which comes from the highest ranking neighboring node. This produces an unambiguous decision.

Rule 7. If no other time reference is available, the node will revert to using its own clock as its only time reference.

Rule 8. The information of Item 1, Table 1, as received, gives the time difference between the local clock and the clock at each neighboring node (including signal transit time) as measured at the neighboring node. Item 1 to Table 1, as transmitted, is the same information as it is measured at the local node. Employing Equation (3), with $D_{BA}$ assumed equal to $D_{AB}$, (relatively good assumption for symmetrical broad band duplex data links), use the two pieces of information to determine the time difference between the clocks at two nodes with the signal transit time removed.

$$T_B - T_A = \frac{\Delta T_B - \Delta T_A}{2} + \frac{D_{BA} - D_{AB}}{2} \quad (3)$$

(As an alternative to assuming $D_{BA}$ equal to $D_{AB}$, their difference can be measured at the time of installation by using a portable clock, and this measured difference can be used in the equation.)

Rule 9. Item 2 of Table 1, as received, will provide information about the measured but uncorrected error in the clocks at neighboring nodes. Add this to the clock difference determined by Rule 8 to find the error in the local clock as determined by information received via any particular neighboring node. The error determined in this way using information from the particular neighbor selected by Rules 1 through 6 is used as the measured but uncorrected error in the local clock.

Item 2 of Table 1 and Rule 9 permit the error in any clock to be determined without the necessity to correct the error in any clock of the network. This permits a very useful independence between the correction of any network clock (or any other change in the time of any clock) and the measurement of the error in any other network clock.

The first six Rules given above essentially follow the procedures described by Darwin and Prim (Darwin and Prim, U.S. Pat. No. 2,986,723 "Synchronization in a System of Interconnected Units", May 30, 1961) for a master-slave system to assure that each local clock is slaved to the signal from the particular neighbor that will provide the best path to the highest ranking clock and avoid all feedback paths that would contribute instability.

For Time Reference Distribution via the best path, it is only necessary to apply Rules 8 and 9 to the particular neighboring node selected by the application of the first six rules as the immediate reference, since only this measurement is used to determine the error in the local clock. However, it is desirable to apply Rules 8 and 9 to all received signals. This will provide information that can be used for monitoring purposes. It can help to develop confidence in the time reference received via the selected path if the other paths give nearly the same time error evaluation for the local clock. It can also be used to give an alarm if differences occur which are greater than should be expected. A measurement via one particular path that differs greatly from measurements via all the others indicates a potential problem in the path, and it can be used as a trouble shooting aid.

At nodes which are connected to several neighbors, the above procedures provide timing information over multiple paths each of which can indicate the error in the local clock. However, for this particular Time Reference Distribution technique (TRDVBP), only information received over the path which has been selected as best is used for the local time reference. All of the other time error information is used only for secondary purposes. The Time Reference Distribution techniques to be described later (TRDVSN and TRDVPSN) make better use of this additional information and the improvement accumulates for nodes that are farther from the master.

One other characteristic of the Time Reference Distribution technique of this invention is related to the application of Rules 1 through 7. Darwin and Prim (U.S. Pat. No. 2,986,723 "Synchronization in a System of Interconnected Units", May 30, 1961) observed for a master-slave system that if the master should fail (and this applies to other nodes down the line also) there will be obsolete information stored in the network indicating that some nodes are still referencing the failed master. This results from the length of time that is required for information about the failure to disseminate to all nodes that were using the failed node as their time reference. The information only progresses one node farther from the failed node for each information exchanged period. In order to avoid problems, sufficient time must be allowed following a failure to assure that the obsolete information has been removed from any particular node (via normal information exchange) before that node can be selected as the immediate reference by a neighboring node. A systematic method of determining the waiting period resulted from a study at Clarkson College (Letter Report for Period Jan. 1, 1975 to Feb. 1, 1975, "DCA Network Timing/Synchronization Evaluation Modeling", RADC Job Order 95670029, and Letter Report for period Feb. 1, 1975 to Mar. 1, 1975, "DCA Network Timing/Synchronization Evaluation Modeling", RADC Job Order 95670029). A counter is used in the method and the sixth item of information in Table 6 may be used to transmit the state of the nodal counter to neighboring nodes. After using Rules 1 through 7 above to select a neighboring node as a tentative reference, additional Rules are applied to determine when to accept this tentative reference as the actual time reference.

Rule 10. For each information exchange period, if the tentative reference is its own clock, the node's time reference is taken from its own clock and its counter is reduced by one unless the counter is already at zero, in which case it is left zero.

Rule 11. For each information exchange period, if the counter of the tentative reference is greater than the local counter, the node takes its time reference from its own clock and increases its counter by one.

Rule 12. For each information exchange period, if the counter of the tentative reference is smaller than the local counter, the reference is accepted from the tentative reference node and the local counter is set to be one greater than the counter of the tentative reference.

Formal proofs demonstrate that this procedure will always allow sufficient time for the obsolete information to be removed from the tentative reference.

Time Reference Distribution Over All Parallel Paths with the Same Number of Tandem Links To The Ultimate Master (Via All Senior Neighbors (TRDVSN)

This new time Reference Distribution technique also distributes a time reference from the highest ranking node to the other nodes of the network and is easily reorganized to accommodate failures. However, in this technique the error in the local clock is determined by using information from all neighboring nodes having fewer links between themselves and the master than the least number of links between the local node and its master (all senior neighbors).

Table 2 lists the information transmitted by each node to its neighbors when using this Time Reference Distribution Technique (TRDVSN).

TABLE 2

INFORMATION PASSED FROM EACH NODE TO ITS NEIGHBORS FOR TIME REFERENCE DISTRIBUTION VIA ALL SENIOR NEIGHBORS (TRDVSN)

Figure 6:
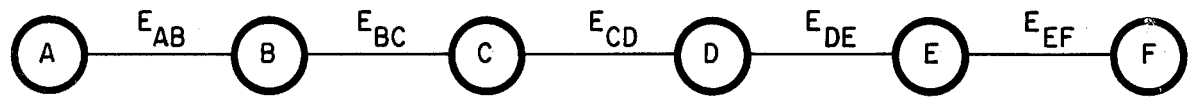
FIG. 6 shows tandem links between nodes.

1. Rank of the clock used as the master time reference for the local clock.
2. Number of tandem links between the local node and its master time referenc. (An example of a tandem link is shown in FIG. 6).
3. Time difference between the local clock and the clock at the other end of the link as observed at the local clock (includes signal transit time from one node to the other).
4. Measured but uncorrected error in the local clock based on information from those of its neighbors which have fewer links between themselves and the master than the local node has between itself and the master (all senior neighbors).
5. Estimated inaccuracy (stated as a variance) of the uncorrected error in the local clock based on information from those of its neighbors which have fewer links between themselves and the master than the local node has between itself and the master (all senior neighbors).

Note: Substitutions can be made for the above information for contingency situations.

This Table provides a type of information which is different from that provided in the Time Reference Distribution technique using the best path to the master (TRDVBP). It is the estimated inaccuracy (stated as the variance of a random distribution) of the measured but uncorrected error in the local clock. A brief discussion of this information and how these estimates of the inaccuracy of the measured error can be made will provide a basis for understanding the rules for applying the information of Table 2. First, consider that the time of the master clock itself may have some statistical error relative to some standard time such as Coordinated Universal Time (UTC). For purposes of this discussion, let the error in the master clock have a gaussian distribution with zero mean and variance $\sigma_0^2$. Also a transmission link will contribute an error to the measured difference between the clocks at the two ends of the link. This error is due to differences in propagation time in the two directions, time delay differences in the transmitters and receivers at the two ends of the link, and errors contributed by the measurement equipment. This measurement error introduced by a transmission link can be assumed to come from an ensemble with a gaussian distribution having zero means and variance $\sigma^2$, where $\sigma^2$ depends upon the properties of the medium and the characteristics of the equipment at the two ends of the link. During system design an estimated value of $\sigma^2$ is assigned to each transmission link based on system engineering factors. Then for several links in tandem the distribution of the clock error measurement will be the sum of several gaussian distributions. This sum is also a gaussian distribution with a mean equal to the sum of the means of the individual contributors and variance equal to the sum of their variances. Since the means of the error distribution for each of the tandem transmission links is zero, the best estimate for the error in the local clock is the actual measurement, X, at the end of the tandem connection and the innaccuracy (stated as a variance of the clock error measurement) is given by Equation (5).

$$\sigma_t^2 = \sigma_0^2 + \sigma_1^2 + \ldots + \sigma_n^2 \qquad (5)$$

Figure 7:
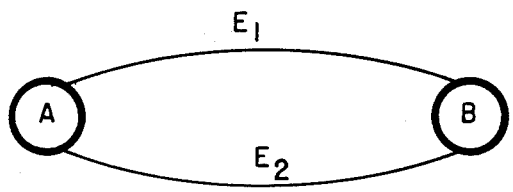
FIG. 7 shows parallel links between nodes.

The effect is considerably different for several parallel paths (see FIG. 7) where there might be differences in the measurement of clock error at the ends of n parallel paths. Let $X_1, X_2, \ldots, X_n$ represent the measurement of clock error at the ends of the n parallel paths, and let the respective inaccuracies (variances) of the paths be $\sigma_1^2$, $\sigma_2^2, \ldots \sigma_n^2$. Then the best estimate for the error, E, in the local clock as determined from the combination of the parallel paths is given by Equation (6).

$$E = \frac{\frac{X_1}{\sigma_1^2} + \frac{X_2}{\sigma_2^2} + \ldots + \frac{X_n}{\sigma_n^2}}{\frac{1}{\sigma_1^2} + \frac{1}{\sigma_2^2} + \ldots + \frac{1}{\sigma_n^2}} \qquad (6)$$

This estimate of the error, E, in the local clock is used as the measured error for the combination of parallel paths. The variance associated with this measured error is given by Equation (7).

$$\sigma_p^2 = \frac{1}{\frac{1}{\sigma_1^2} + \frac{1}{\sigma_1^2} + \ldots + \frac{1}{\sigma_n^2}} \qquad (7)$$

Notice that if there is more than one path the time error measurement provided by a combination of parallel paths is better (statistically more accurate) than the measurement from any one of the individual paths. Further observe that by sequential application of the two above combining methods for arriving at clock error measurements and the inaccuracies of the measurements, tandem-parallel combinations of timing paths can be accommodated.

Equations (6) and (7) could be derived by considering the correct time error measurements as signal and the inaccuracies (stated as variances) as noise. Text book procedures for maximizing the combined signal to noise ratio similar to those used for matched filters or optimum diversity signal combiners could then be applied. The following discussion provides the same answer (i.e., that of Equations (6) and (7)) and it seems to fit this application.

Let f(x) represent a population with normal distribution having mean $\mu$ and variance $\sigma^2$. Elementary texts on the subject of probability and statistics show that the best estimate for the mean of a population with a normal distribution is the sample mean $\bar{x}$, $$\text{where } \bar{X} = \frac{1}{n} \sum_{i=1}^{n} X_i$$

where $x_i$ are random samples from the population, and n is the number of samples used to determine the estimate.

The texts also show that the distribution of the sample means $f(\bar{x})$ is normal with mean $\mu$ and variance $\sigma^2/n$. Let $f_k(\bar{x})$ be the distribution of the sample means for samples of $n_k$ members of the population $f(\bar{x})$. Then $f_k(\bar{x})$ is a normal distribution with mean $\mu$ and variance $$\sigma_k^2 = \sigma^2/n_k$$

$$\text{Let } s = \sum_{i=1}^{r} n_k$$

Then $f_s(\bar{x})$ is a normal distribution with mean $\mu$ and variance $$\sigma_s^2 = \sigma^2/(n_1 + n_2 + \ldots + n_r)$$

By definition $$\bar{X}_k = \frac{1}{n_k} \sum_{i=1}^{n_k} X_i \text{ so that}$$

$$\bar{X}_s = \frac{1}{n_1 + n_2 + \ldots + n_r} \sum_{i=1}^{n_1 + n_2 + \ldots + n_r} X_i$$

$$= \frac{1}{n_1 + n_2 + \ldots + n_r} [\sum_{i=1}^{n_1} X_i + \sum_{i=n_1}^{n_1+n_2} X_i + \ldots + \sum_{i=n_{r-1}}^{n_{r-1}+n_r}]$$

$$= \frac{1}{n_1 + n_2 + \ldots + n_r} [n_1 \bar{X}_1 + n_2 \bar{X}_2 + \ldots + n_r \bar{X}_r]$$

$$= \frac{1}{\frac{\sigma^2}{\sigma_1^2} + \frac{\sigma^2}{\sigma_2^2} + \ldots + \frac{\sigma^2}{\sigma_r^2}} [\frac{\sigma^2 \bar{X}_1}{\sigma_1^2} + \ldots \frac{\sigma^2 \bar{X}_2}{\sigma_2^2} + \frac{\sigma^2 \bar{X}_r^2}{\sigma_r^2}]$$

$$= \frac{\frac{\bar{X}_1}{\sigma_1^2} + \frac{\bar{X}_2}{\sigma_2^2} + \ldots + \frac{\bar{X}_r}{\sigma_r^2}}{\frac{1}{\sigma_1^2} + \frac{1}{\sigma_2^2} + \ldots + \frac{1}{\sigma_r^2}}$$

where each $\bar{x}_k$ is the sample mean for the number of samples that give a variance for that sample mean of $\sigma_k^2$. Similarly, for the associated variance $$\sigma_s^2 = \frac{\sigma^2}{n_1 + n_2 + \ldots + n_r}$$

$$= \frac{\sigma^2}{\frac{\sigma^2}{\sigma_1^2} + \frac{\sigma^2}{\sigma_2^2} + \ldots + \frac{\sigma^2}{\sigma_r^2}}$$

-continued
$$= \frac{1}{\frac{1}{\sigma_1^2} + \frac{1}{\sigma_2^2} + \ldots + \frac{1}{\sigma_r^2}}$$

These resulting equations for E and $\sigma_s$ are the ones given in Equations (6) and (7).

Looking at this differently, let the measurement made over the first of the two paths be $M_1 = V + E_1$, where V is the true value and $E_1$ is the error introduced by the first path. Similarly, let the measurement over the second path be $M_2 = V + E_2$. It is desirable to weight and combine these two measurements in such a way as to obtain the statistically most accurate measurement.

$$M_{AB} = W_1 M_1 + W_2 M_2 = W_1 (V + E_1) + W_2 (V + E_2) \quad (8)$$

The weighting factors $W_1$ and $W_2$ apply to both the true values and the errors. Although the weighted true values add linearly, the weighted error values (being random) add as the square root of the sum of the squares, so that:

$$M_{AB} = (W_1 + W_2) V + \sqrt{W_1^2 E_1^2 + W_2^2 E_2^2} \quad (9)$$

Since it is desired that the combined result $M_{AB}$, be the true value with a statistically minimum error, $W_1$ plus $W_2$ must be equal to 1, and the expression under the radical sign must be made minimum by the selection of $W_1$ and $W_2$. Substituting $(1-W_1)$ for $W_2$ in Equation (9) and finding the value of $W_1$ that minimizes the statistical error gives Equation (10), and subtracting this value of $W_1$ from 1 gives $W_2$ as shown in Equation (11).

$$W_1 = E_2^2/(E_1^2 + E_2^2) \quad (10)$$

$$W_2 = E_1^2/(E_1^2 + E_2^2) \quad (11)$$

Putting these weighting factors in Equation (8) gives Equation (12).

$$M_{AB} = \frac{\frac{M_1}{E_1^2} + \frac{M_2}{E_2^2}}{\frac{1}{E_1^2} + \frac{1}{E_2^2}} \quad (12)$$

By using this combined value as given by Equation (12) as one member of a new parallel pair, computing a new combined value, and repeating this procedure until the total number of parallel paths are included, the desired weighting factor for the measurement from the path P of n parallel paths can be written as Equation (13).

$$W_p = \frac{\frac{1}{E_p^2}}{\sum_{i=1}^{n} \frac{1}{E_i^2}} \quad (13)$$

The resulting statistical error for the combined measurement based on n parallel paths as found by substituting the weighting factors of Equation (13) into Equation (9) is given by Equation (14).

$$E_c = \frac{1}{\sqrt{\sum_{i=1}^{n} \frac{1}{E_i^2}}} \quad (14)$$

Equations (13) and (14) give the same answer as Equations (6) and (7).

In the TRDVSN technique, the information of Table 2 is transmitted by each node to its neighbors. A set of rules is used by each node in employing this information as received from its neighbors to provide the desired time reference distribution. The rules are:

Rule 1A — A node initially entering the network will use its own clock as its time reference until a better time reference can be determined. Its own clock is a basic reference to which it returns when no other reference is available. It will supply the rank of its own clock to its neighbors as item 1 of Table 2 which gives the rank of its master time reference.

Rule 2A — Item 1 of Table 2, as received from neighboring nodes, provides each node with the rank of the clock used as the master time reference by each of its neighbors. For use in determining its own time reference, i.e., measuring the error in its own clock, a node will select from among its neighbors those nodes (or the single node) using the highest ranking clock for their master time reference. The rank of the master time reference used by the selected neighbors will be supplied to all neighbors of the local node as item 1 of Table 2, unless the local clock has a higher rank. If the local clock has a higher rank, it is used as the master reference and its rank is supplied to all neighbors of the local node as item 1 of Table 2. Repeated applications of this rule by all nodes will result in all nodes referencing the same highest ranking master clock.

Rule 3A — If the local node is referencing its own clock there are no links between the local node and its master reference and this information is supplied to its neighbors as Item 2 of Table 2. The second type of information, Item 2 of Table 2, as received from its neighbors, provides the local node with information about the number of links between each neighboring node and that neighbor's master time reference. Unless the clock at the local node outranks the master reference of all of its neighbors, the number of links between the local node and the master is greater by one than that of the neighbors (or neighbor) selected by Rule 2A which have the least number of links between themselves and their master. This information is supplied to the neighboring nodes as item 2 of Table 2. Repeated application of this rule will result in establishing the desired timing hierarchy. Item 2 of Table 2 as transmitted to neighboring nodes and as received from them indicates the position in the hierarchy of the local node relative to each of its neighbors.

Rule 4A — Item 3 of Table 2, as received from neighboring nodes, gives the time difference between the local clock and the clock at each neighboring node (including the signal transit time to the neighboring node) as measured at the neighboring node. Item 3 of Table 2, as transmitted, is the same type of information as it is measured at the local node. Employing Equation (3) with $D_{BA}$ assumed equal to $D_{AB}$, use the two pieces of information (item 3 as received and as transmitted) to determine the time difference between the two clocks with the transit time removed. This provides a measurement of the actual time difference (no transit time included) between the local clock and the clock at each neighboring node.

$$T_B - T_A = \frac{\Delta T_B - \Delta T_A}{2} + \frac{D_{BA} - D_{AB}}{2} \quad (3)$$

Rule 5A — Item 4 of Table 2, as received, gives the measured but uncorrected error in each neighboring node's clock. Add to this the difference between the local clock and the clock at each neighboring node as obtained by Rule 4A to determine a set of measurements of the error in the local clock based on information from each neighboring node.

Rule 6A — Item 5 of Table 2, as received from neighboring nodes, gives the estimated inaccuracy (stated as a variance) of the measured but uncorrected error in the clock at each neighboring node. For each neighboring node, this information is added to the estimated inaccuracy (stated as variance) contributed by the path between the neighboring node and the local node as determined during network design. The resulting set of inaccuracies (variances) are the inaccuracies for the timing information received from each neighboring node.

Rule 7A — Select from among the set of error measurements for the local clock as determined by Rule 5A and the associated inaccuracies as determined by Rule 6A only those for neighbors with fewer links between themselves and the master than the local node has between itself and the master (all senior neighbors). Combine these error measurements and their associated inaccuracies (variances) according to equation (6) to determine an estimate of the error in the local clock based upon information received from this particular class of neighbors.

$$E = \frac{\frac{X_1}{\sigma_1^2} + \frac{X_2}{\sigma_2^2} + \ldots + \frac{X_n}{\sigma_n^2}}{\frac{1}{\sigma_1^2} + \frac{1}{\sigma_2^2} + \ldots + \frac{1}{\sigma_n^2}} \quad (6)$$

This information is provided by the local node to all neighbors as Item 4 of Table 2.

Rule 8A — Select from among the set of inaccuracies (stated as variances) as determined by Rule 6A only the ones for neighbors with fewer links between themselves and the master than the local node has between itself and the master (all senior neighbors). Combine them according to Equation 7 to evaluate the inaccuracy of the error measurement for the local clock based on this particular set of neighbors.

$$\sigma_t^2 = \frac{1}{\frac{1}{\sigma_1^2} + \frac{1}{\sigma_2^2} + \ldots \frac{1}{\sigma_n^2}} \quad (7)$$

This information is provided by the local node to all neighbors as Item 5 of Table 2.

The selection performed in Rules 7A and 8A prevents the information of feedback loops for the timing information in the network and avoids any contribution to instability that could result. It is obvious that some computation could be saved by doing the selection earlier in Rules 5A and 6A, but the additional information obtained by delaying the selection to Rules 7A and 8A can be useful for monitoring and trouble shooting.

Notice that since Equation (7) is the same as the denominator of Equation (6) the same computation can be used in both equations.

The exchange of items 3, 4, and 5 of Table 2 and the application of Rules 4A, 5A, 6A, 7A and 8A permits the error in any clock to be determined without the necessity to correct the error in any clock of the network. This permits a very useful independence between the correction of any network clock (or any other change in the time of any network clock) and the measurement of the error in any other network clock.

Rule 9A — If there is a failure of any transmission link or the time transfer over any transmission link, a very high inaccuracy is assigned to that particular link for use where its inaccuracy is applied to Rules 6A and 7A and also a low rank can be assigned to the neighboring node connected to the local node by the particular transmission link. By applying this high inaccuracy (stated as a variance) to Equations (6) and (7) this link will have a negligible contribution to the timing function. If the transmission link that failed was the only one to a neighboring node having fewer links between itself and the master than the local node has between itself and the master (senior neighbor) the node will temporarily reference its own clock while nodal timing is being reorganized using Rules 2 and 3.

Rule 10A — If a nodal clock fails, that node will be assigned a very low rank (unless it has a suitable backup clock), and simultaneously, all links connecting to the node can be assigned very high inaccuracies. This can be used to prevent the failed node from being a significant contributor to the timing functions, if the characteristics of the network make this desirable.

It was mentioned in the discussion of the TRDVBP time reference distribution technique that it was possible for obsolete information to remain in the network for a considerable period of time following a failure. Unless there is time for this obsolete information to clear neighboring nodes before it is acted upon, it could be self perpetuating and could cause improper organization of the network. There are several ways to make sure that there is sufficient time following a failure for obsolete information to clear before a node selects a new neighbor for its reference. This problem with obsolete information results from the use of the method for the selection of the best path for the time reference for each node in a particular situation whereby two neighboring nodes could be referencing the same master over separate long paths which might differ considerable in the number of links in each path to the master. In the TRDVSN technique this same problem cannot occur in the same way. In an operating system using multiple parallel paths of the same length (TRDVSN), the number of links between a node's neighbors and the master cannot differ by more than one from the number of links between the local node and the master. Therefore, when any node senses a failure, waiting two information exchange periods will assure that obsolete information has been removed from its neighbors.

The TRDVSN time reference distribution technique, combining time reference information from all senior neighbors can provide considerably improved accuracy over the TRDVBP technique which uses only the best path to the master; and it can also provide other advantages. Closed feedback paths are prevented by not permitting the use of time reference information from any neighboring nodes that have as many or more links between themselves and their master as the local node has between itself and its master. This is an unnecessarily tight restriction. A node can use information from neighboring nodes which have the same number of links between themselves and the master as the local node has between itself and the master (peer neighbors) and still avoid closed feedback paths, provided the resulting measurement (as determined by computation) is only used locally and/or is supplied only to nodes with more links between themselves and the master than the local node has between itself and the master (junior neighbors).

Figure 4:
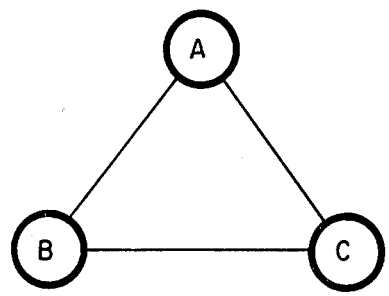
FIG. 4 shows a typical three node network.

Consider combining timing information at node B of FIG. 4 that comes over the paths AB and ACB. If this combined measurement at node B is then used to determine a combined timing measurement at node C, this new node C measurement could then be used to determine a new combined measurement at node B which could be used to determine a new one at C, etc. The resulting iterative process would change the timing at nodes B and C over a large number of iterations even without introducing any new measurements from node A. The passing of information back and forth between nodes B and C cannot improve its accuracy, but could possibly introduce additional error due to the link BC each time the link is traversed. It is desirable to provide rules that will make effective use of combined timing information from multiple paths while preventing such iterations. These iterations can be avoided if each node is prevented from using timing information that has been previously influenced by that same node. To accomplish this and still make effective use of timing information over many multiple paths, two classes of timing information can be maintained at each node. Class 1 timing information (clock error measurements and inaccuracy values for those measurements) is based only on information received from nodes higher in the hierarchy than the local node, while Class 2 timing information is based on information received from all nodes not lower in the hierarchy (those at the same level in addition to those higher). If only Class 1 information is used, there will no be closed feedback paths, but useful information from other nodes at the same level in the hierarchy will not be used in determining the clock errors. If, when deriving Class 2 timing information a node uses Class 2 information from other nodes higher in the hierarchy but is restricted to only Class 1 information from nodes at the same level in the hierarchy, the closed paths will still be avoided and the undesirable iterations will be avoided.

A simple set of rules can provide for this, and for many networks it will result in improved accuracy. The next section describes these rules.

Combined Time Reference Distribution Through All Neighboring Nodes at the Same Or Higher Level in the Timing Hierarchy (Peer and Senior Neighbors (TRDVPSN)

This Time Reference Distribution technique (TRDVPSN) also distributes a time reference from the highest ranking node to all other nodes of the network and is easily reorganized to accommodate failures. However, in this technique, different classes of information are supplied to different classes of neighboring nodes. For purposes of identifying these differences, neighboring nodes will be separated into four classes. Class A neighboring nodes include all neighboring nodes using the highest ranking master time reference which have fewer links between themselves and the master than the local node has between itself and the master (senior neighbors). Class B neighboring nodes include all those neighboring nodes using the highest ranking master line reference which have no more links between themselves and the master than the local node has between itself and the master (both peer and senior neighbors). Therefore, the Class B neighbors have the class A neighbors as a subset. Class C neighboring nodes include all those neighboring nodes using the highest ranking master time reference which have more links between themselves and the master than the local node has between itself and the master (junior neighbors). Class D neighboring nodes include all those neighboring nodes not using the highest ranking master time reference (illegitimate neighbors).

Table 3 lists the information transmitted by each node to its neighbors when using this preferable Time Reference Distribution technique (TRDVPSN).

TABLE 3

INFORMATION PASSED FROM EACH NODE TO ITS NEIGHBORS FOR TIME REFERENCE DISTRIBUTION OVER MULTIPLE PATHS COMPRISING THOSE WITH THE LEAST NUMBER OF LINKS TO THE ULTIMATE MASTER AND THOSE WITH ONE MORE THAN THE LEAST NUMBER. (TRDVPSN)

1. The rank of the clock used as the master time reference for the local clock.
2. The number of links between the local node and its master time reference.
3. The time difference between the local clock and the clock at the other end of the link as observed at the local clock. (This time difference includes the time for the signal to transit from one node to the other.)
4A. Measured but uncorrected error in the local clock based on information from class A neighbors (senior neighbors).
4B. Measured but uncorrected error in the local clock based on information from class B neighbors (both peer and senior neighbors).
5A. Estimated inaccuracy (stated as a variance) of the measured error in the local clock based on information from class A neighbors (senior neighbors.
5B. Estimated inaccuracy (stated as a variance) of the measured error in the local clock based on information from class B neighbors (both peer and senior neighbors).
Certain substitutions can be made for the above information to handle contingency situations.
Note that Items 4 and 5 are divided into different classes.
Items 4A and 5A are based only on information received from class A neighbors (senior neighbors) and this information is transmitted to class B neighbors (peer and senior neighbors). Items 4B and 5B are based on information from class B neighbors (peer and senior neighbors), and this information is transmitted only to class C neighbors (junior neighbors). This permits more of the available information to be used to improve accuracy while still avoiding all timing feedback loops. Throughout this discussion it is assumed that information Items 4B and 5B are only transmitted to class C neighbors (junior neighbors) while Items 4A and 5A are transmitted to class B neighbors (peer and senior neighbors). However, it is obvious that all information could be transmitted to all neighbors with each node selecting the information that it should use.

A set of rules is used by each node in employing the information from Table 3, as received from its neighbors, to provide the desired time reference distribution. The rules are:

Rule 1B — A node initially entering the network will use its own clock as its time reference until a better reference can be determined. Its own clock is a basic reference to which it returns when no other reference is available. It will supply the rank of its own clock to its neighbors as Item 1 of Table 3, which gives the rank of its master time reference.

Rule 2B — Item 1 of Table 3, as received from neighboring nodes, provides each node with the rank of the clock used as the master time reference by each of its neighbors. For use in determining its own time reference, i.e., measuring the error in its own clock, a node will select from among its neighbors those nodes (or the single node) using the highest ranking clock for their master time reference. The rank of the master used by the selected neighbors will be supplied to all neighbors of the local node as Item 1 of Table 3, unless the local clock has a higher rank. If the local clock has a higher rank, it is used as the master and its rank is supplied to all neighbors of the local node as Item 1 of Table 3. Repeated application of this rule will result in all nodes referencing the same highest ranking master clock.

Rule 3B — If the local node is referencing its own clock there are no links between the local node and its master reference and this information is supplied to its neighbors as Item 2 of Table 3. The second type of information, Item 2 of Table 3, as received from its neighbors provides the local node with information about the number of links between each neighboring node and that neighbor's master time reference. Unless the clock at the local node outranks the master reference of all of its neighbors, the number of links between the local node and the master is greater by one than that of the neighbors (or neighbor) selected by Rule 2B which have the least number of links between themselves and their master. This information is supplied to the neighboring nodes as Item 2 of Table 2. Repeated application of this rule will result in establishing the desired timing hierarchy. Item 2 of of Table 2 as transmitted to neighboring nodes and as received from them indicates the position in the hierarchy of the local node relative to each of its neighbors.

Rule 4B — Item 3 of Table 3, as received from neighboring nodes, gives the time difference between the local clock and the clock at each neighboring node (including the signal transit time from the local node to the neighboring node) as measured at the neighboring node. Item 3 of Table 3, as transmitted, is the same information as it is measured at the local node. Employing Equation (3) with $D_{BA}$ assumed equal to $D_{AB}$, use these two pieces of information (item 3 as received and as transmitted) to determine the time difference between the two clocks with the transit time removed. This provides a measurement of the actual time difference (no transit time included) between the local clock and the clock at each neighboring node.

$$T_B - T_A = \frac{\Delta T_B - \Delta T_A}{2} + \frac{D_{BA} - D_{AB}}{2} \quad (3)$$

Rule 5B — Each neighboring node for which the local node is a class B neighbor (peer or senior neighbor) transmits Item 4A of Table 3 to the local node while each neighboring node for which the local node is a class C neighbor (junior neighbor) transmits Item 4B of Table 3 to the local node. This information, as received, gives the measured but uncorrected error for each neighboring node. Add this information (as received) to the difference between the local clock and each neighboring clock as determined by Rule 4B. The result is a set of error measurements for the local clock as determined by information received from each neighbor. (The reason for using Item 4A information from some neighbors and Item 4B from others is to avoid closed feedback paths while still making very effective use of the available information).

Rule 6B — Each neighboring node for which the local node is a class B neighbor (peer or senior neighbor) transmits Item 5A of Table 3 to the local node while each neighboring node for which the local node is a class C neighbor (junior neighbor) transmits Item 5B of Table 3 to the local node. This information, as received, is the estimated inaccuracy (stated as a variance) of the measured but uncorrected error associated with each neighboring node. Add to this inaccuracy from each neighboring node the estimated inaccuracy of the link between that neighbor and the local node as determined during engineering design. The result is a set of inaccuracies for the measured error in the clock at the local node based on information from each neighbor. The estimated inaccuracy (expressed as a variance) attributed to the link between a neighbor and the the local node as established during engineering design is based on several parameters. It includes an estimate of any differences between $D_{BA}$ and $D_{AB}$ of equation 3 that might exist due to differences in propagation time through the medium (should average to zero over a long period of time), and to differences in delay through the transmitters and receivers at the two ends of the link. It also includes inaccuracies in the equipment used to measure the difference between the received signal and the local clock.

Rule 7B — Select from the set of error measurements for the local clock as determined by Rule 5B and the associated inaccuracies (variances) as determined by Rule 6B, only those for class A neighbors (senior neighbors). Combine these error measurements according to equation 6 to determine an estimate of the error in the local clock based on class A neighbors (senior neighbors). This information is provided to class B neighbors (peer and senior neighbors) as Item 4A of Table 3 and it could be used at the local node for any clock corrections that are made.

$$E = \frac{\frac{X_1}{\sigma_1^2} + \frac{X_2}{\sigma_2^2} + \ldots + \frac{X_n}{\sigma_n^2}}{\frac{1}{\sigma_1^2} + \frac{1}{\sigma_2^2} + \ldots + \frac{1}{\sigma_n^2}} \quad (6)$$

Rule 8B — Select from the set of inaccuracies (variances) determined by Rule 6B only the ones for class A neighbors (senior neighbors). Combine them according to Equation (7) to determine the inaccuracy of the measured error for the local clock base on class A neighbors (senior neighbors). This information is provided to class B neighbors (peer and senior neighbors) as Item 5A of Table 3, and it could also be used at the local node.

$$\sigma_t^2 = \cfrac{1}{\cfrac{1}{\sigma_1^2} + \cfrac{1}{\sigma_2^2} + \ldots + \cfrac{1}{\sigma_n^2}} \qquad (7)$$

The measurements of the error in the local clock and the associated inaccuracies as determined by Rules 7B and 8B were based only on class A neighbors (senior neighbors) to assure that no closed loops could exist by which a node's own clock could contribute to the reference used for determining its own error. This restriction applies to determining the error in the local clock and the estimated inaccuracy of this measurement for use at all class B neighbors (peer and senior neighbors). However, there might be some class C neighbors (junior neighbors) for which this local node is a class A neighbor (senior neighbor). In many cases the local node can supply to its class C neighbors (junior neighbors) a better estimate of its own clock's error and the associated inaccuracy by making an additional measurement (calculation) based on all of its class B neighbors (peer and senior neighbors). Since this measurement goes only to class C neighbors (junior neighbors), and class C neighbors (junior neighbors) are never used in determining the clock error or the associated inaccuracy for the local clock, the undesirable loops are avoided and better error measurements are provided to the class C neighboring nodes (junior neighbors).

Rule 9B — Use equation 6 to combine the set of error measurments from all class B neighbors (peer and senior neighbors) into an evaluation of the local clock error. The set of error measurements to be used in equation 6 are determined by Rule 5B and the set of associated inaccuracies are determined by Rule 6B. Provide the resulting measurement of the error in the local clock to all class C neighbors (junior neighbors) as Item 4B of Table 3. It can also be used as a more accurate measurement for clock corrections at the local node than that obtained from Rule 7B.

$$E = \cfrac{\cfrac{X_1}{\sigma_1^2} + \cfrac{X_2}{\sigma_1^2} + \ldots + \cfrac{X_n}{\sigma_n^2}}{\cfrac{1}{\sigma_1^2} \quad \cfrac{1}{\sigma_2^2} \quad \cfrac{1}{\sigma_n^2}} \qquad (6)$$

Rule 10B — Use Equation (7) to combine the set of inaccuracies for all class B neighbors (peer and senior neighbors) as determined by Rule 6B into an estimate for the inaccuracy of the measured error in the local clock. This inaccuracy information is provided to all class C neighbors (junior neighbors) as Item 5B of Table 3.

$$\sigma_t^2 = \cfrac{1}{\cfrac{1}{\sigma_1^2} + \cfrac{1}{\sigma_2^2} + \ldots + \cfrac{1}{\sigma_n^2}} \qquad (7)$$

The exchange of Items 3, 4A, 4B, 5A, and 5B of Table 3 and the application of Rule 4B, 5B, 6B, 7B, 8B, 9B, and 10B permits the error in any clock to be determined without the necessity to correct the error in any clock of the network. This permits a very useful independence between the correction of any network clock (or any other change in the time of any network clock) and the measurement of the error in any other network clock.

When compared with the Time Reference Distribution via the best path, this time reference distribution via peer and senior neighbors not only provides more accurate time at nodes remote from the master reference and reduces the probability of massive reorganization effects following failures of links or nodes, it also provides the possibility for quantitative evaluation of the fitness of the timing subsystem. Since each time measurement has a corresponding inaccuracy (stated as a variance), these can be used to provide a quantitative alarm system. This leads to Rule 11B.

Rule 11B — Rule 5B provides a set of error measurements for the local clock based on information from each neighboring node. Rule 6B provides a corresponding set of inaccuracies for these error measurements. Rule 9B provides a combined measurement for the error in the local clock. Rule 10B provides a corresponding inaccuracy for the combined measurement. Subtract the combined measurement as determined by Rule 9B from each member of the set determined by Rule 5B. The resulting set gives the difference between each individual measurement and the combined measurement. Add the inaccuracy (stated as a variance) determined by Rule 10B to each member of the set of inaccuracies obtained by Rule 6B and tak the square root to obtain a set of estimates of the standard deviations of the clock error measurements based on information from each neighbor relative to the combined clock error measurement. Each member of the set of differences between individual measurements and the combined measurement is divided by the estimate of the corresponding standard deviation to obtain a normalized set of ratios. The lowest level alarm could be activated when the ratio reaches 2. This would not be very significant since this ratio would have about a 5% probability of occurance in a normally operating system. A second level alarm when the ratio reaches 3 should generate some interest since its probability of occurance in a normally operating system should be only about 0.3 percent. A third level alarm when the ratio reaches 4 should initiate at least a trouble investigation since its probability of occuring in a normally operating system should be less than 0.01 percent. A fourth level alarm when the ratio reaches 5 should initiate definite corrective action since its probability of occuring in a normally operating system should be less than one in a million.

The TRDVSN and TRDVPSN techniques also have other capabilities for checking for an erroneous information exchange. For example the node which is serving as master should be referencing its own clock and informing its neighbors that there are zero links between itself and its master. Every node connected directly to the master should inform its neighbors that it has one link between itself and its master.

If any neighboring node tells the master that there is other than one link between itself and the master, the master can interpret this as detection of a problem. For every node in a stabilized operating system, either each neighboring node should be reporting the same number of links between itself and the master as the local node, or it should be reporting one more or one less than the local node. Any node receiving a report from one of its neighbors that the neighbor's distance (number of links) from the master differs by more than one from the local node's distance from the master has detected a problem that should either cause reorganization of the network or other corrective action.

The procedure presented here for providing a very good time reference distribution through a digital communications network is based on an assumption that the different paths passing the time reference between two nodes are independent, i.e., do not share any of the same transmission links. Although this independence does not always exist, the degradation due to the dependencies that do exist should generally be acceptable. It is this assumption of independence that makes it possible to provide an accurate time reference distribution through the network by the application of simple procedures and calculations at each node using only simple information from neighboring nodes. In order to allow fully for dependent paths through the network, it would be necessary to keep a record of all dependent paths and make the necessary information available at every location where a calculation involving a particular dependent path is made. This would impose a very great increase in both communications and computation support to the timing subsystem. Because of the extensive increase in computation and communications required to permit full consideration of dependent paths, it is recommended that the independence assumption be made and that the simple procedure described above be applied to obtain improvements over time reference distribution via only the best path. The assumption of independent paths will indicate an apparent accuracy which is somewhat greater than the actual accuracy. The actual accuracy will usually lie somewhere between the accuracy obtained using only the best path and the accuracy indicated by using the above rules. One method of partially compensating for the effect of dependent paths might be to select a typical network arrangement using typical link inaccuracies, calculate the inaccuracy at each node by the above rules and also calculate it taking dependent paths into consideration. The average difference between the two method could be determined for each level in the hierarchy and stored at every node. Then this average value for the local node's level in the hierarchy could be added to the value obtained using the set of rules above. The result might be expected to be statistically more accurate than just accepting the value using the assumption of path independence with no attempt to compensate. However, it is recommended that the independence assumption be made and the rules applied to achieve a very accurate distribution by a simple technique.

Examples

Some simple examples will be used to provide additional understanding of the preceding discussion. FIG. 1 is a diagrammatic illustration of an example network containing 12 nodes 2 through 24 with interconnecting links 26 through 70.

The interconnecting links were randomly assigned with the number of links selected to provide an average of four connections per node. Names were assigned to the nodes from the first 12 letters of the alphabet. The number beneath the name on each node in FIG. 1 is the rank of that node. The inaccuracy (given as a variance) for each link (also used as the path demerits for the TRDVBP technique) is shown as the number next to each interconnecting link in FIG. 1. These link inaccuracies were randomly assigned with the ratio of the number of 2's to the number of 1's equal to 1/2, and the ratio of the number of 3's to the number of 2's approximately 1/2.

Applying the rules of the TRDVBP technique to the network of FIG. 1, after three information exchange periods, as shown in Table 4, the network reaches its steady state configuration. Applying the rules of the TRDVSN or TRDVPSN techniques to the same network, after three information exchange periods, as shown in Table 5 the network reaches the steady state hierarchy shown in FIG. 2.

TABLE 4

Condition of the Local Node After Each Information Exchange With the TRDVBP Technique

| Node | Initial Information Exchange | 2nd Information Exchange | 3rd Information Exchange | 4th Information Exchange |
|------|------|------|------|------|
| A | 11, 0, 11 | 2, 2, 11 | 1, 3, 11 | 1, 3, 11 |
| B | 10, 0, 10 | 5, 1, 10 | 1, 3, 10 | 1, 3, 10 |
| C | 7, 0, 7 | 1, 1, 7 | 1, 1, 7 | 1, 1, 7 |
| D | 6, 0, 6 | 1, 2, 6 | 1, 2, 6 | 1, 2, 6 |
| E | 2, 0, 2 | 1, 1, 2 | 1, 1, 2 | 1, 1, 2 |
| F | 1, 0, 1 | 1, 0, 1 | 1, 0, 1 | 1, 0, 1 |
| G | 5, 0, 5 | 1, 3, 5 | 1, 3, 5 | 1, 3, 5 |
| H | 12, 0, 12 | 2, 2, 12 | 1, 3, 12 | 1, 3, 12 |
| I | 3, 0, 3 | 1, 1, 3 | 1, 1, 3 | 1, 1, 3 |
| J | 4, 0, 4 | 3, 1, 4 | 1, 2, 4 | 1, 2, 4 |
| K | 8, 0, 8 | 2, 2, 8 | 1, 2, 8 | 1, 2, 8 |
| L | 9, 0, 9 | 3, 1, 9 | 1, 2, 9 | 1, 2, 9 |

The triads represent, rank of ultimate reference, path demerit, and rank of local node.

TABLE 5

Condition of the Local Node After Each Information Exchange With the TRDVPSN Technique

| Node | Initial Information Exchange | 2nd Information Exchange | 3rd Information Exchange | 4th Information Exchange |
|------|------|------|------|------|
| A | 11, 0, 11 | 2, 1, 11 | 1, 2, 11 | 1, 2, 11 |
| B | 10, 0, 10 | 5, 1, 10 | 1, 2, 10 | 1, 2, 10 |
| C | 7, 0, 7 | 1, 1, 7 | 1, 1, 7 | 1, 1, 7 |
| D | 6, 0, 6 | 1, 1, 6 | 1, 1, 6 | 1, 1, 6 |
| E | 2, 0, 2 | 1, 1, 2 | 1, 1, 2 | 1, 1, 2 |
| F | 1, 0, 1 | 1, 0, 1 | 1, 0, 1 | 1, 0, 1 |
| G | 5, 0, 5 | 1, 1, 5 | 1, 1, 5 | 1, 1, 5 |
| H | 12, 0, 12 | 2, 1, 12 | 1, 2, 12 | 1, 2, 12 |
| I | 3, 0, 3 | 1, 1, 3 | 1, 1, 3 | 1, 1, 3 |
| J | 4, 0, 4 | 2, 1, 4 | 1, 2, 4 | 1, 2, 4 |
| K | 8, 0, 8 | 2, 1, 8 | 1, 2, 8 | 1, 2, 8 |
| L | 9, 0, 9 | 3, 1, 9 | 1, 2, 9 | 1, 2, 9 |

The triads represent, rank of the ultimate reference, number of links between the local node and the ultimate reference, rank of the local node.

Observe that for this example network, (assuming that the link inaccuracies are also used for the path demerits) the path demerit information for the steady state at each node using the TRDVBP technique is also the inaccuracy estimate for each node.

To consider inaccuracies for the TRDVSN technique, observe (FIG. 2) that the only class A neighbor (senior neighbor) for nodes C, D, E, G, and I is node F. Therefore, the inaccuracy (variance) for each of these nodes is the same as the inaccuracy (variance) of the link connecting the node to its reference. This is shown in Table 6. For these nodes, it is the same as the inaccuracy (variance) using the TRDVBP technique.

TABLE 6

VARIANCES AT NODES OF EXPERIMENTAL NETWORK SHOWN IN FIG. 1

| Node | Variance for TRDVBP | Variance for TRDVSN | 5A Variance for TRDVPSN | 5B Variance for TRDVPSN |
|------|------|------|------|------|
| A | 3 | 1.71 | 1.47 | .86 |
| B | 3 | 1.71 | 1.09 | .75 |
| C | 1 | 1 | 1 | .57 |
| D | 2 | 2 | 2 | .92 |
| E | 1 | 1 | 1 | .50 |
| F | 0 | 0 | 0 | 0 |
| G | 3 | 3 | 3 | 1.50 |
| H | 3 | 3 | 2.50 | 1.36 |

TABLE 6-continued
VARIANCES AT NODES OF EXPERIMENTAL NETWORK SHOWN IN FIG. 1

| Node | Variance for TRDVBP | Variance for TRDVSN | 5A Variance for TRDVPSN | 5B Variance for TRDVPSN |
|---|---|---|---|---|
| I | 1 | 1 | 1 | .67 |
| J | 2 | 1.33 | 1 | .76 |
| K | 2 | 1.20 | 1 | .59 |
| L | 2 | 1.43 | 1.17 | 1.05 |

Applying the TRDVSN technique, for node A, the class A neighbors (senior neighbors are C and E. Adding the inaccuracy of the path from node A to node C (AC = 3) to the inaccuracy for node C (C = 1) gives 4. Adding the inaccuracy of the path from node A to node E (AE = 2) to the inaccuracy for node E (E = 1) gives 3. Combining these in equation 7 gives for the inaccuracy at node A using the TRDVSN technique $$\sigma^2 = 1/(\tfrac{1}{4} + \tfrac{1}{3}) = 12/7 = 1\ 5/7$$

This is surely an improvement over the inaccuracy (variance) of 3 with the TRDVBP technique. Following the same procedure for node B gives an inaccuracy (variance) of $$\sigma^2 = 1/(\tfrac{1}{4} + \Delta) = 12/7 = 1\ 5/7$$

Following the same procedure for nodes H, J, K, and L gives the values shown in Table 6.

For the TRDVPSN technique, nodes C, D, E, G, and I have the same values for 5A inaccuracies as in the TRDVSN technique because their only class A neighbor (senior neighbor) is node F. However, these same nodes can include in their evaluation of 5B inaccuracies the information from the rest of their class B neighbors (peer and senior neighbors). Take node C for example. It has D, E, and F as class B neighbors (peers and senior neighbors). Adding the variance of the path between C and F (CF = 1) to the inaccuracy of F (F = 0) gives 1, and adding the inaccuracy of the path between C and D (CD = 2) to the 5A inaccuracy of D (D = 2) gives 4 while adding the inaccuracy of the path from C to E (CE = 1) to the inaccuracy of E (E = 1) gives 2. Combining the information from these parallel paths by equation 7 gives for the 5B inaccuracy (variance) of node C.

$$\sigma^2 = \frac{1}{\frac{1}{1} + \frac{1}{4} + \frac{1}{2}} = \frac{4}{7}$$

This variance is less than the 5A inaccuracy for node C and can be used by node C's class C neighbor (junior neighbor) node A to evaluate its 5A inaccuracy since node C is a class A neighbor (senior neighbor) of node A. Following the above procedure the 5B inaccuracies for nodes D, E, G, and I can be evaluated and are shown in Table 6. The 5B inaccuracies from these nodes are then used to determine the 5A inaccuracies for nodes A, B, H, J, K, and L. Take node A for example. It has C and E for class A neighbors (senior neighbors). Adding the inaccuracy of the link from A to C (AC = 3) to the 5B inaccuracy of node C (C = 4/7) gives 24, and adding the inaccuracy of the link from A to E (AE = 2) to the 5B inaccuracy of node E (E = ½) gives 2½. Combining these by equation 7 gives $$\sigma^2 = \frac{1}{\frac{1}{25/7} + \frac{1}{5/2}} = \frac{1}{\frac{7}{25} + \frac{2}{5}} = \frac{25}{17} = 1\frac{8}{17}$$

This is better than the value for node A under the TRDVSN technique. Following the same type of procedure, the rest of the 5A inaccuracies of Table 6 can be evaluated. Equation 7 can also be used to evaluate the 5B inaccuracies for nodes A, B, H, J, K and L. These would help to improve the accuracy of the timing of any class C neighbors (junior neighbors) that these nodes might have. Of course, in the present example, they have no class C neighbors (junior neighbors).

Throughout this example discussion, and for all of the values shown in Table 6, it has been assumed that the inaccuracy of the master reference is zero. If the master reference has a nonzero inaccuracy (stated as a variance) this should be directly added to all entries of Table 6 to get the inaccuracies at the various nodes.

The particular example above used one particular node, node F, as the master. Any of the nodes of a network could be used as master and different results could be expected for different nodes used as master. Table 7 shows the different layers of hierarchy for the network of FIG. 1 when each node in succession is chosen for the master. (See also FIGS. 2 and 3).

TABLE 7
LAYERS OF HIERARCHY FOR THE NETWORK OF FIGURE 1 USING THE TRDVSN AND THE TRDVPSN TECHNIQUES - USING EACH NODE AS MASTER

| A (Master) | E (Master) | I (Master) |
|---|---|---|
| BCE | ACFHIK | EFJKL |
| DFGHIK | BDGJL | ACDGH |
| JL | | B |
| B (Master) | F (Master) | J (Master) |
| ADG | CDEGI | GIL |
| CEDFJL | ABHJKL | BDEFK |
| HIK | | ACH |
| C (Master) | G (Master) | K (Master) |
| ADEF | BDFJ | EHIL |
| BFHIKL | ACEIL | ACDFJ |
| J | HK | BG |
| D (Master) | H (Master) | L (Master) |
| BDFGL | EK | DIJK |
| AEIJK | ACFI | BCEFGH |
| H | BDGJL | A |

Notice that only two of them, E master and F master, have only three layers; and one of these, F master, was the one used in the first example. Notice from Table 6, that the least accurate node using the TRDVPSN technique was node G. Node G is one of the nodes that is directly connected to the master so that it is not elegible for improvement by using multiple paths under the restriction that only multiple paths to class A neighbors (senior neighbors) be used. It seems to indicate that under some circumstances the system designer might choose to design the system so as to deny the use of timing information received over particular links in order to improve the timing accuracy in some parts of the network.

Figure 9:
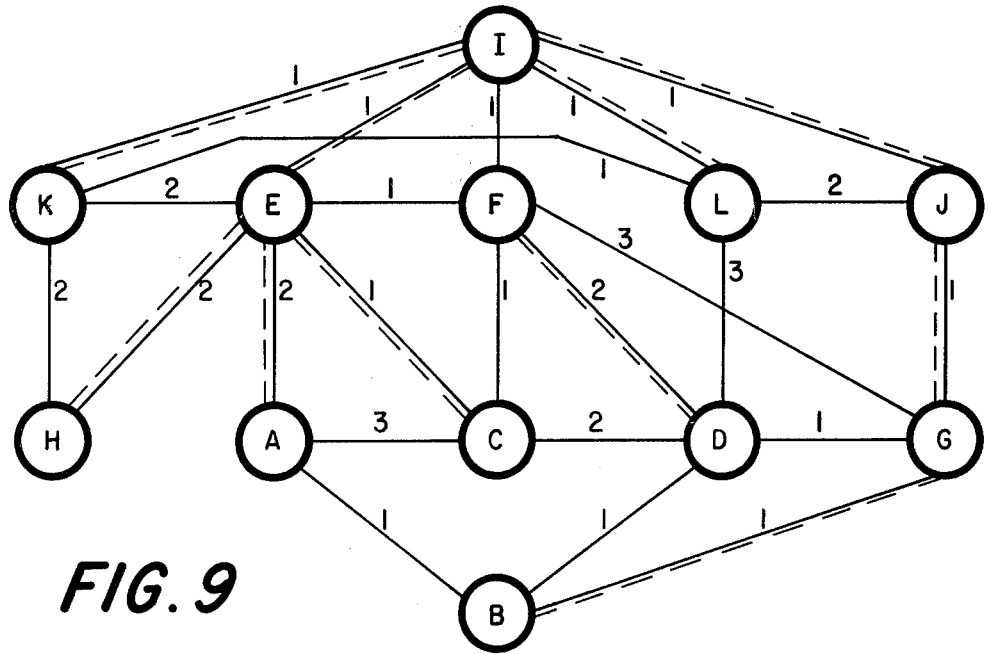
FIG. 9 is the natural hierarchy of the network of FIG. 8 having node I as the selected master.
Figure 8:
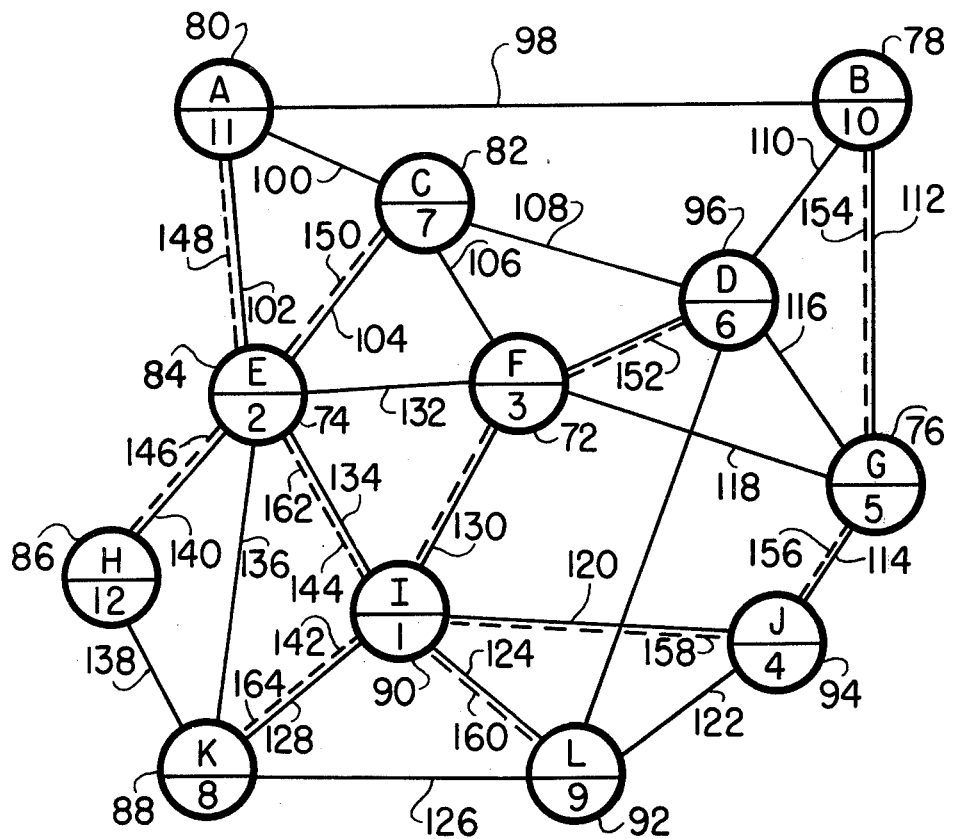
FIG. 8 is a diagrammatic representation of a network utilizing a time reference distribution technique according to another embodiment of the invention.

The example above shows that high quality links (low variance links) to the master node are desirable. For the second example, interchange the ranking of node F with that of node I so that node I becomes the master. The hierarchy using the TRDVBP technique following this change is shown as dashed lines 142 through 164 in FIGS. 8 and 9 which diagrammatically illustrate an example network containing 12 nodes 72 through 96 with interconnecting links 98 through 140. As with FIG. 1, the interconnecting links were randomly assigned with the number of links selected to provide an average of four connections per node. Names are assigned to the nodes from the first 12 letters of the alphabet. The number beneath the name on each node in FIG. 8 is the rank of that node. The inaccuracy (expressed as a variance) for each link (also used as the path demerits for the TRDVBP technique) is shown as the number next to each interconnecting link in FIG. 9. Table 8 lists the inaccuracies for this arrangement using the TRDVBP technique.

TABLE 8

VARIANCES AT NODES OF EXPERIMENTAL NETWORK SHOWN IN FIG. 3

| Node | Variance for TRDVBP | Variance for TRDVSN | Variance for TRDVPSN | Variance for TRDVPSN |
|------|---------------------|---------------------|----------------------|----------------------|
| A    | 3                   | 3                   | 2.55                 | 1.52                 |
| B    | 3                   | 0.96                | 0.88                 | 0.65                 |
| C    | 2                   | 1                   | 0.80                 | 0.65                 |
| D    | 3                   | 1.71                | 1.52                 | 0.68                 |
| E    | 1                   | 1                   | 1                    | 0.55                 |
| F    | 1                   | 1                   | 1                    | 0.67                 |
| G    | 2                   | 1.33                | 1.18                 | 0.81                 |
| H    | 3                   | 1.50                | 1.27                 | 1.27                 |
| I    | 0                   | 0                   | 0                    | 0                    |
| J    | 1                   | 1                   | 1                    | 0.75                 |
| K    | 1                   | 1                   | 1                    | 0.55                 |
| L    | 1                   | 1                   | 1                    | 0.55                 |

Although there are still four 3's, there are fewer 2's than with the first example. In applying the TRDVSN and TRDVPSN techniques to FIG. 3, the only class A neighbor (senior neighbor) of nodes E, F, J, K, and L is node I. Therefore the inaccuracy of each of these nodes is the same as the inaccuracy of each link connecting each of these nodes to node I. Node A's only class A neighbor (senior neighbor) is node E so with the TRDVSN technique its inaccuracy is that of node E (= 1) plus the inaccuracy of the link AE (= 2) giving the inaccuracy for node A as 3, the same as it was by the TRDVBP technique. Node H has two class A neighbors (senior neighbors) E and K. The inaccuracy at H of the timing reference received from node E is 3, i.e. the inaccuracy of node E (= 1) plus the inaccuracy of link EH (= 2), the inaccuracy at H received from node K is 3, i.e., the inaccuracy of node K (= 1) plus the inaccuracy of link HK (= 2). Combining these by Equation (7) gives $$\sigma^2 = 1/(\tfrac{1}{3} + \tfrac{1}{3}) = 3/2 = 1\tfrac{1}{2}$$

Continuing to apply Equation (7), the remainder of Table 8 is completed. In the TRDVSN technique, only class A neighbors (senior neighbors) are used in evaluating the node's inaccuracy. In the TRDVPSN technique the 5A inaccuracy is evaluated using only information from class A neighbors (senior neighbors); but each class A neighbor's (senior neighbor's) type 5B inaccuracy is used in evaluating this 5A inaccuracy. The 5B inaccuracy is evaluated on the basis of class B neighbors (peer and senior neighbors) but only type 5A information from peer neighbors is used in evaluating the 5B inaccuracy.

Comparing Table 8 with Table 6, the advantage of having high quality (low inaccuracy) links connected to the master can be seen. Also notice the significant improvement in the type 4B information (its accuracy is indicated by the 5B inaccuracy information) which each node uses for its own clock when the TRDVPSN technique is used. Even the TRDVSN technique is considerably better than the TRDVBP technique in this example and although there will be exceptions, this will generally be true.

The TRDVPSN technique provides several advantages over the TRDVBP technique.

1. It provides greater accuracy.
2. It makes better use of available information.
3. It reduces or eliminates potential problems with obsolete information remaining in the network following failures that could cause problems with the TRDVBP technique if improperly handled.
4. It provides quantitative monitoring and quantitative evaluation of the condition of the timing system.

It is expected that in addition to these specific advantages of the TRDVSN and TRDVPSN techniques described above, continued study of these techniques will show them to have many other advantages over previous methods.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A time reference distribution system for distributing an accurate time reference to a plurality of nodes of an electronic network, paths connecting each node to one or more neighboring nodes, which distribution system can also be used to synchronize the network, each node including: a local clock, means for measuring the local clock's time error relative to a system master clock, means for weighting (where such weighting may include a selection function) the paths connecting the nodes over which the time reference is distributed through the network, and means for correcting the time error of the local clock so that said means for measuring the local clock's time error is not affected by the correction of the clock error at any other node and so that the time reference distribution system does not contain any closed distribution paths.

2. The system of claim 1, wherein said network is a digital communications network.

3. A time reference distribution system for an electronic network having a multiplicity of nodes of differing ranks connected by information paths wherein the time reference is distributed from the highest ranking node in the network to all other nodes over the best available transmission path to each node and including means whereby the network is reorganized to accommodate failures; a master reference clock, a local clock included in each node, each node having means for transmitting the following information to its immediate neighbors over respective transmission links:

(1) the time difference between the local clock and the clock at the other end of the transmission link as observed at the local clock (including signal transit time);
(2) the measured but uncorrected error in the local clock relative to its ultimate master reference;
(3) the rank of the clock used as the ultimate master reference for the local clock;

(4) the demerit rating of the transmission path over which the time reference is passed from the ultimate reference clock to the local clock; and (5) the rank of the local clock;

each node further comprising means employing information items (1)–(5), as received from its neighbors, to provide the desired time reference distribution, according to the following set of rules:

Rule 1 — a node initially entering the network will use its own clock as its only time reference until a better time reference can be selected;

Rule 2 — whenever a transmission link or neighboring node used for immediate time reference fails, the node will temporarily use its own clock as its only time reference until an alternate selection is made;

Rule 3 — if a neighboring node being used as the immediate reference should have a change in its master reference to one of lower rank, the local node will temporarily reference its own clock until an alternate selection is made;

Rule 4 — the time reference for the local clock is taken from the neighboring node which uses the highest ranking node as its master reference, except that, if the local clock outranks the others, the local clock is used as the master reference and if any two links come from nodes referencing the same highest ranking master clock, the criterion is inconclusive and Rule 5 as follows is applied:

Rule 5 — the demerit rating of the path from each neighboring node to the master reference is combined with the known demerit of the path from the local node to the neighbor to give the overall demerit rating for paths to the master reference through each link entering the local node whereby when the test of Rule 4 is inconclusive because more than one of the immediate time references come from neighboring nodes ultimately referencing the same highest ranking clock, this path demerit information is used to select from among them the time reference that comes over the transmission path with the lowest demerit, thereby preventing closed feedback loops from forming because such paths would have greater demerit, except when two or more paths have the same lowest demerit rating, wherein this test will also be inconclusive and Rule 6 as follows is applied;

Rule 6 — the rank of the clock at each neighboring node is used to select from among those links with master time reference coming from the same highest ranking clock over paths with the same lowest demerit rating, that one which comes from the highest ranking neighboring node to produce an unambiguous decision;

Rule 7 — if no other time reference is available, the node will revert to using its own clock as its only time reference;

Rule 8 — the time difference between the local clock and the clock at each neighboring node as it is measured at that neighboring node including signal transit time is used to determine the time difference between the clocks at the two nodes with the signal transit time removed, as follows:

$$T_B - T_A = \frac{\Delta T_B - \Delta T_A}{2} + \frac{D_{BA} - D_{AB}}{2}$$

where $T_A$ is the time of the clock at node A, $T_B$ is the time of the clock at node B, $\Delta T_A$ is the measured time difference at node A, $\Delta T_B$ is the measured time difference at node B, $D_{AB}$ is the signal transit time from node A to node B, and $D_{BA}$ the signal transit time from node B to node A;

Rule 9 — the measured but uncorrected error in the clocks at neighboring nodes is added to the clock difference determined by information received via any particular neighboring node and the error determined in this way using information from the neighbor selected by Rules 1 through 6 is used as the measured but uncorrected error in the local clock.

4. A time reference distribution system for an electronic network having a multiplicity of nodes of differing ranks connected by information paths wherein the time reference from the highest ranking node is distributed to the other nodes of the network, including means whereby the network is reorganized to accommodate failures, and a master reference clock, each local node including a local clock, means for determining the error in the local clock by using information from all neighboring nodes having fewer links between themselves and the ultimate master than the lowest number of links between the local node and its ultimate master each node having means for transmitting the following information to its immediate neighbors over respective transmission lines:

(1) the rank of the clock used as the ultimate master time reference for the local clock;

(2) the number of links between the local node and its ultimate master reference;

(3) the time difference between the local clock and the clock at the other end of the link as observed at the local clock (including signal transit time);

(4) measured but uncorrected error in the local clock based on information from those of its neighbors which have fewer links between themselves and the ultimate master than the local node has between itself and and the ultimate master (all senior neighbors); and (5) the estimated inaccuracy of the measured but uncorrected error in the local clock based on information from those of its neighbors which have fewer links between themselves and the ultimate master than the local node has between itself and the ultimate master;

each node further comprising means employing information items (1)–(5) from each neighbor to provide the desired time reference distribution, according to the following set of rules:

Rule 1 — a node initially entering the network will use its own clock as its time reference until a better time reference can be provided and will supply the rank of its own clock to its neighbors;

Rule 2 — each node is provided with the rank of the clock which is used as the ultimate time reference by each of its neighbors, and for use in determining its own time reference, a node will select from among its neighbors the node or nodes using the highest ranking clock for its or their ultimate time reference, with the rank of this ultimate time reference which is used by the selected neighbors being supplied to all neighbors of the local node, unless the local clock has a higher rank, in which case it is used as the ultimate reference for the local node and its rank is supplied to all neighbors of the local node;

Rule 3 — if the local node is referencing its own clock there are no links between the local node and its master reference and this information is supplied to each neighboring node and if the local node is not referencing its own clock the number supplied to neighbors is greater by one than the number for the neighbor or neighbors with the least number of links between itself and the master reference;

Rule 4 — the time difference between the local clock and the clock at each neighboring node (including the signal transit time between nodes) as measured at the neighboring node is used to determine the time difference between the two clocks with the transit time removed, which provides a measurement of the actual time difference between the local clock and the clock at each neighboring node according to the following equation:

$$T_B - T_A = \frac{\Delta T_B - \Delta T_A}{2} + \frac{D_{BA} - D_{AB}}{2}$$

where $T_A$ is the time of the clock at node A, $T_B$ is the time of the clock at node B, $D_{AB}$ is the signal transit time from node A to node B, and $D_{BA}$ the signal transit time from node B to node A, $\Delta T_B$ is the measured difference at node B, and $\Delta T_A$ is the measured difference at node A;

Rule 5 — the measured but uncorrected error in each neighboring node's clock is added to the difference between the local clock and the clock at each neighboring node as obtained by Rule 4 to determine a set of measurements of the error in the local clock based on information from each neighboring node;

Rule 6 — the estimated time inaccuracy for each neighboring node is added to the estimated inaccuracy of the path between the neighboring node and the local node as assigned during network design whereby the resulting set of inaccuracies are the inaccuracies for the timing information received from each neighboring node;

Rule 7 — select from among the set of error measurements for the local clock as determined by Rule 5 and the associated inaccuracies as determined by Rule 6 only the ones for neighbors with fewer links between themselves and the ultimate master than the local node has between itself and the ultimate master and combine these error measurements and their associated inaccuracies according to the following equation to evaluate the error in the local clock based upon this particular class of neighbors:

$$E = \frac{\frac{X_1}{\sigma_1^2} + \frac{X_2}{\sigma_2^2} + \cdots + \frac{X_n}{\sigma_n^2}}{\frac{1}{\sigma_1^2} + \frac{1}{\sigma_2^2} + \cdots + \frac{1}{\sigma_n^2}}$$

where E is the error in the local clock $X_1, X_2, \ldots, X_n$ are the error measurements determined by Rule 5, $\sigma_1^2, \sigma_2^2, \ldots, \sigma_n^2$ are the inaccuracies as determined by Rule 6; the resulting error, E, evaluated for the local clock being transmitted to all neighbors of the local node;

Rule 8 — select from among the set of inaccuracies as determined by Rule 6 only the ones for neighbors with fewer links between themselves and the ultimate master than the local node has between itself and the ultimate master and combine them according to the following equation to evaluate the inaccuracy of the error measurement for the local clock based on this particular set of neighbors:

$$\sigma_t^2 = \frac{1}{\frac{1}{\sigma_1^2} + \frac{1}{\sigma_2^2} + \cdots + \frac{1}{\sigma_n^2}}$$

this information being provided by the local node to all neighbors.

5. The system according to claim 4, wherein said means at each node employing information items (1)–(5) provides the desired time reference distribution according to the following additional rule:

Rule 9 — if there is a failure of any transmission link or the time transfer over any transmission link, a very high inaccuracy is assigned to that particular link for use where its inaccuracy is applied in Rules 6 and 7 and optionally a low rank is assigned to the neighboring node connected to the local node by the particular transmission link such that when this high inaccuracy is applied to the equations of Rules 7 and 8, it results in this link having a negligible contribution to the timing function, provided, however, that if the transmission link that failed was the only link from the local node to a neighboring node having fewer links between itself and the ultimate master than the local node has between itself and the ultimate master the node will temporarily reference its own clock while nodal timing is being reorganized using Rules 2 and 3.

6. The system according to claim 5, wherein said means at each node employing information items (1)–(5) provides the desired time reference distribution according to the following additional rule:

Rule 10 — if there is a failure of a nodal clock, that node is assigned a very low rank and optionally all links connecting to the node are assigned very high variances.

7. The system of claim 4, in which Rule 5 provides a set of error measurements for the local clock based on information from each neighboring node while Rule 6 provides a corresponding set of inaccuracies for these error measurements, Rule 7 provides a combined measurement for the error in the local clock and Rule 8 provides a corresponding inaccuracy for the combined measurement; the system further having means for establishing and using the following rule by each node in employing the information items (1)–(5) to provide the desired time reference distribution:

Rule 11 — subtract the combined measurement as determined by Rule 7 from each member of the set determined by Rule 5 whereby the resulting set gives the difference between each individual measurement and the combined measurement, add the inaccuracy determined by Rule 8 to each member of the set of inaccuracies obtained by Rule 6 and take the square root to obtain a set of estimates of the standard deviations of the clock error measurements based on information from each neighbor relative to the combined clock error measurement with each member of the set of differences between individual measurements and the combined measurement being divided by the corresponding standard deviation to obtain a normalized set of ratios, whereby a lowest level alarm would be activated when the ratio reaches 2, a second level alarm would be activated when the ratio reaches 3, a third level alarm would be activated when the ratio reaches 4, and a fourth level alarm would be activated when the ratio reaches 5.

8. A time reference distribution system for an electronic network having a multiplicity of nodes, connected by transmission links, each node having a local clock with a unique rank, wherein the time reference from the highest ranking clock is distributed through said transmission lines to all nodes of the network; including means whereby the network is reorganized to accommodate failures, wherein different classes of information are supplied to different classes of neighboring nodes, i.e., neighboring nodes are separated into four classes, namely, Class A neighboring nodes which include all neighboring nodes using the highest ranking ultimate reference and which have fewer links between themselves and the ultimate reference than the local node has between itself and the ultimate reference, Class B neighboring nodes which include all those neighboring nodes using the highest ranking ultimate reference and which have no more links between themselves and the ultimate reference than the local node has between itself and the ultimate reference, whereby the Class B neighbors have the Class A neighbors as a subset, Class C neighboring nodes which include all those neighboring nodes using the highest ranking ultimate reference and which have more links between themselves and the ultimate reference than the local node has between itself and the ultimate reference, and Class D neighboring nodes which include all those neighboring nodes not using the highest ranking ultimate reference; each node having means for transmitting to its immediate neighbors the following information:
   (1) the rank of the clock used as the master time reference for the local clock;
   (2) the number of links between the local node and its master time reference;
   (3) the time difference between the local clock and the clock at the other end of the link as observed at the local clock, which includes signal transit time from one node to the other;
   (4A) measured but uncorrected error in the local clock based on information from Class A neighbors;
   (4B) measured but uncorrected error in the local clock based on information from Class B neighbors;
   (5A) estimated inaccuracy of the measured error in the local clock based on information from Class A neighbors;
   (5B) estimated inaccuracy of the measured error in the local clock based on information from Class B neighbors;
wherein information items (4A) and (5A) are based only on information received from Class A neighbors and this information is transmitted to Class B neighbors; information items (4B) and (5B) are based on information from Class B neighbors and this information is transmitted only to Class C neighbors;
each node further comprising means for employing information items (1)-(5B) as received from neighboring nodes to provide the desired time reference distribution, according to the following set of rules:

Rule 1 — a node initially entering the network will use its own clock as its time reference until a better reference can be determined and will supply the rank of its own clock to its neighbors, and the node will revert to its own clock whenever no better reference is available;

Rule 2 — each node is provided with the rank of the clock which is used as the ultimate time reference by each of its neighbors, and for use in determining its own reference, i.e., measuring the error in its own clock, a node will select from among its neighbors the node or nodes using the highest ranking clock as the ultimate time reference with the rank of this ultimate time reference used by the selected neighbors supplied to all neighbors of the local node, unless the local clock has a higher rank, in which event the local clock is used as the ultimate reference and the local clock's rank is supplied to all neighbors of the local node;

Rule 3 — each node is provided with information about the number of links between each neighboring node and that neighbor's ultimate reference with the number of links between the local node and the ultimate time reference being greater by one than the number for the neighbor or neighbors selected by Rule 2 which have the least number of links between themselves and the ultimate reference, unless the local node is referencing its own clock in which event the number of links between itself and the ultimate reference is zero, which evaluation of the number of links between the local node and its ultimate reference is supplied to all neighbors and, each neighboring node is assigned to the appropriate one or more of classes A, B, C, and D;

Rule 4 — the time difference between the local clock and the clock at each neighboring node (including the signal transit time between nodes) as measured at the neighboring node is used to determine the time difference between the two clocks with the transit time removed so as to provide a measurement of the actual time difference (no transit time included) between the local clock and the clock at each neighboring node according to the following equation:

$$T_B - T_A = \frac{\Delta T_B - \Delta T_A}{2} + \frac{D_{BA} - D_{AB}}{2}$$

where $\Delta T_A$ is the time difference measured at node A and $\Delta T_B$ is the time difference measured at node B and where $T_A$ is the time of the clock at node A, $T_B$ is the time of the clock at node B, $D_{AB}$ is the signal transit time from node A to node B, and $D_{BA}$ the signal transit time from node B to node A;

Rule 5 — each neighboring node for which the local node is a class B neighbor transmits information item (4A) to the local node while each neighboring node for which the local node is a Class C neighbor transmits information item (4B) to the local node such that this information, as received gives the measured but uncorrected error for the neighboring node which is added to the difference between the local clock and each neighboring clock as determined by Rule 4 to provide a result which is a set of error measurements for the local clock as determined by information received from each neighbor;

Rule 6 — each neighboring node for which the local node is a Class B neighbor transmits information item (5A) to the local node while each neighboring node for which the local node is a Class C neighbor transmits information item (5B) to the local node such that this information, as received is the estimated inaccuracy of the measured but uncorrected error associated with each neighboring node, which is added to the estimated inaccuracy of the link between that neighbor and the local node as determined during engineering design such that the result is a set of inaccuracies for the measured error in the clock at the local node based on information from each neighbor;

Rule 7 — select from the set of error measurements for the local clock as determined by Rule 5 and the associated inaccuracies determined by Rule 6 only those for Class A neighbors and combine these error measurements according to the following equation to evaluate the error in the local clock based on Class A neighbors, which information is provided to Class B neighbors as information item (4A) and it is also used at the local node for any clock corrections that are made:

$$E = \frac{\frac{X_1}{\sigma_1^2} + \frac{X_2}{\sigma_2^2} + \ldots + \frac{X_n}{\sigma_n^2}}{\frac{1}{\sigma_1^2} + \frac{1}{\sigma_2^2} + \ldots + \frac{1}{\sigma_n^2}}$$

where E is the error in the local clock, $X_1, X_2, \ldots, X_n$ represent the error measurements determined by Rule 5, and $\sigma_1^2, \sigma_2^2, \ldots, \sigma_n^2$ are the inaccuracies as determined by Rule 6;

Rule 8 — select from the set of inaccuracies determined by Rule 6 only the ones for Class A neighbors and combine them according to the following equation to determine an estimate of the inaccuracy of the measured error for the local clock based on Class A neighbors which information is provided to Class B neighbors as information item (5A) and it can also be used at the local node:

$$\sigma_t^2 = \frac{1}{\frac{1}{\sigma_1^2} + \frac{1}{\sigma_2^2} + \ldots + \frac{1}{\sigma_n^2}}$$

Rule 9 — use the equation of Rule 7 to combine the set of error measurements from all Class B neighbors in a determination of the local clock error with the set of error measurements used in that equation determined by Rule 5 and the set of associated inaccuracies determined by Rule 6, and provide the resulting estimate of the error in the local clock to all Class C neighbors as information item (4B);

Rule 10 — use the equation of Rule 8 to combine the set of inaccuracies for all Class B neighbors as determined by Rule 6 into an estimate for inaccuracy of the measured error in the local clock and provide this inaccuracy information to all Class C neighbors as information item (5B).

9. The system of claim 8, in which Rule 5 provides a set of error measurements for the local clock based on information from each neighboring node while Rule 6 provides a corresponding set of inaccuracies for these error measurements, Rule 9 provides a combined measurement for the error in the local clock and Rule 10 provides a corresponding inaccuracy for the combined measurement; the system further having means for establishing and using the following rule by each node in employing the information items (1)–(5B) to provide quantitative monitoring of the desired time reference distribution:

Rule 11 — subtract the combined measurement as determined by Rule 9 from each member of the set determined by Rule 5 whereby the resulting set gives the difference between each individual measurement and the combined measurement, add the inaccuracy determined by Rule 10 to each member of the set of inaccuracies obtained by Rule 6 and take the square root to obtain a set of estimates of the standard deviations of the clock error measurements based on information from each neighbor relative to the combined clock error measurement with each member of the set of differences between individual measurements and the combined measurement being divided by the corresponding standard deviation to obtain a normalized set of ratios, whereby a lowest level alarm would be activated when the ratio reaches 2, a second level alarm would be activated when the ratio reaches 3, a third level alarm would be activated when the ratio reaches 4, and a fourth level alarm would be activated when the ratio reaches 5.

10. The system according to claim 9, wherein said means at each node employing information items (1)–(5) provides the desired time reference distribution according to the following additional rule:

Rule 12 — if there is a failure of any transmission link or the time transfer over any transmission link, a very high inaccuracy is assigned to that particular link for use where its inaccuracy is applied in Rules 6 and 7 and optionally a low rank is assigned to the neighboring node connected to the local node by the particular transmission link such that when this high inaccuracy is applied to the equations of Rules 7 and 8, it results in this link having a negligible contribution to the timing function, provided, however, that if the transmission link that failed was the only link from the local node to a neighboring node having fewer links between itself and the ultimate master than the local node has between itself and the ultimate master the node will temporarily reference its own clock while nodal timing is being reorganized using Rules 2 and 3.

11. The system according to claim 10, wherein said means at each node employing information items (1)–(5) provides the desired time reference distribution according to the following additional rule:

Rule 13 — if there is a failure of a nodal clock, that node is assigned a very low rank and optionally all links connecting to the node are assigned very high variances.

12. The system according to claim 9, wherein said means at each node employing information items (1)–(5) provides the desired time reference distribution according to the following additional rule:

Rule 13 — if there is a failure of a nodal clock, that node is assigned a very low rank and optionally all links connecting to the node are assigned very high variances..

13. The system according to claim 8, wherein said means at each node employing information items (1)–(5) provides the desired time reference distribution according to the following additional rule:

Rule 12 — if there is a failure of any transmission link or the time transfer over any transmission link, a very high inaccuracy is assigned to that particular link for use where its inaccuracy is applied in Rules 6 and 7 and optionally a low rank is assigned to the neighboring node connected to the local node by the particular transmission link such that when this high inaccuracy is applied to the equations of Rules 7 and 8, it results in this link having a negligible contribution to the timing function, provided, however, that if the transmission link that failed was the only link from the local node to a neighboring node having fewer links between itself and the ultimate master than the local node has between itself and the ultimate master the node will temporarily reference its own clock while nodal timing is being reorganized using Rules 2 and 3.

14. The system according to claim 8, wherein said means at each node employing information items (1)–(5) provides the desired time reference distribution according to the following additional rule:

Rule 13 — if there is a failure of a nodal clock, that node is assigned a very low rank and optionally all links connecting to the node are assigned very high variances.

15. A method for distributing an accurate time reference to numerous locations of an electronic network which can also be used to synchronize the network, comprising the steps of measuring the local clock's time error relative to a system master clock, weighting (where such weighting may include a selection function) multiple paths over which the time reference is distributed through the network, and correcting the time error of the local clock so that the first two steps are not affected by the correction of the clock error at any other node and so that the time reference distribution system does not contain any closed distribution paths.

16. A time reference distribution method for an electronic network having a multiplicity of nodes of differing ranks connected by information paths wherein the time reference is distributed from the highest ranking node in the network to all other nodes over the best available transmission path to each node; the network including means whereby the network is reorganized to accommodate failures, a master reference clock, a local clock included in each node, each node transmitting the following information to its immediate neighbors over respective transmission links:

(1) the time difference between the local clock and the clock at the other end of the transmission link as observed at the local clock (including signal transit time);

(2) the measured but uncorrected error in the local clock relative to its ultimate master reference;

(3) the rank of the clock used as the ultimate master reference for the local clock;

(4) the demerit rating of the transmission path over which the time reference is passed from the ultimate reference clock to the local clock;

(5) the rank of the local clock;

wherein each node employs information items (1)–(5), as received from its neighbors, to provide the desired time reference distribution, according to the following steps:

(1) — a node initially entering the network using its own clock as its only time reference until a better time reference can be selected;

(2) — the node temporarily using its own clock as its only time reference whenever a transmission link or neighboring node used for immediate time reference fails, until an alternate selection is made;

(3) — the local node temporarily referencing its own clock if a neighboring node being used as the immediate reference should have a change in its master reference to one of lower rank, until an alternate selection is made;

(4) — taking the time reference for the local clock from the neighboring node which uses the highest ranking node as its master reference, except that, if the local clock outranks the others, using the local clock as the master reference and if any two links come from nodes referencing the same highest ranking master clock, applying step (5) as follows;

(5) — combining the demerit rating of the path from each neighboring node to the master reference with the known demerit of the path from the local node to the neighbor to give the overall demerit rating for paths to the master reference through each link entering the local node whereby when more than one of the immediate time references come from neighboring nodes ultimately referencing the same highest ranking clock, using this path demerit information to select from among them the time reference that comes over the transmission path with the lowest demerit, thereby preventing closed feedback loops from forming because such paths would have greater demerit, except when two or more paths have the same lowest demerit rating, wherein step (6) as follows is applied;

(6) selecting from among those links with a master time reference coming from the same highest ranking clock over paths with the same lowest demerit rating, that one which comes from the highest ranking neighboring node to produce an unambiguous decision;

(7) — reverting to a node's own clock as its only time reference if no other time reference is available;

(8) — determining the time difference between the local clock and the clock at each neighboring node at the two nodes with the signal transit time removed, as follows:

$$T_B - T_A = \frac{\Delta T_B - \Delta T_A}{2} + \frac{D_{BA} - D_{AB}}{2}.$$

where $T_A$ is the time of the clock at node A, $T_B$ is the time of the clock at node B, $\Delta T_A$ is the measured time difference at node A, $\Delta T_B$ is the measured time difference at node B, $D_{AB}$ is the signal transit time from node A to node B, $D_{BA}$ the signal transit time from node B to node A, and $D_{BA}$ is assumed equal to $D_{AB}$;

(9) — adding the measured but uncorrected error in the clocks at neighboring nodes to the clock difference determined by information received via any particular neighboring node to obtain the measured but uncorrected error in the local clock via that particular neighboring node; which for the path selected by application of steps (4) through (6) at all nodes is the uncorrected error in the local clock for the best available path.

17. A time reference distribution method for an electronic network having a multiplicity of nodes of differing ranks connected by information paths wherein the time reference from the highest ranking node is distributed to the other nodes of the network, the network including means whereby the network is reorganized to accommodate failures, and a master reference clock, each local node including a local clock, means for determining the error in the local clock by using information from all neighboring nodes having fewer links between themselves and the ultimate master than the lowest number of links between the local node and its ultimate master, and each node transmitting the following information to its immediate neighbors over respective transmission lines:

(1) the rank of the clock used as the ultimate master time reference for the local clock;

(2) the number of links between the local node and its ultimate master reference;

(3) the time difference between the local clock and the clock at the other end of the link as observed at the local clock (including signal transit time);

(4) measured but uncorrected error in the local clock based on information from those of its neighbors which have fewer links between themselves and the ultimate master than the local node has between itself and and the ultimate master (all senior neighbors); and (5) the estimated inaccuracy of the measured but uncorrected error in the local clock based on information from those of its neighbors which have fewer links between themselves and the ultimate master than the local node has between itself and the ultimate master;

wherein each local node employs information items (1)-(5) from each neighbor to provide the desired time reference distribution, according to the following steps:

(1) — a node initially entering the network uses its own clock as its time reference until a better time reference can be provided and supplies the rank of its own clock to its neighbors;

(2) — providing each node with the rank of the clock used as the ultimate time reference by each of its neighbors, each node selecting from among its neighbors the node or nodes using the highest ranking clock for its or their ultimate time reference for use in determining its own time reference, the local node supplying to all its neighbors the rank of this ultimate time reference which is used by the selected neighbors, unless the local clock has a higher rank, in which case it is used as the ultimate reference for the local node and its rank is supplied to all neighbors of the local node;

(3) — if the local node is referencing its own clock, then supplying to each neighboring node the information that there are no links between the local node and its master reference; and if the local node is not referencing its own clock the number supplied to the neighbors is greater by one than the number for the neighbor or neighbors with the least number of links between itself and the master reference;

(4) — determining the time difference between the local clock and the clock at each neighboring node with the transit time removed, to provide a measurement of the actual time difference between the local clock and the clock at each neighboring node according to the following equation:

$$T_B - T_A = \frac{\Delta T_B - \Delta T_A}{2} + \frac{D_{BA} - D_{AB}}{2}$$

where $T_A$ is the time of the clock at node A, $T_B$ is the time of the clock at node B, $D_{AB}$ is the signal transit time from node A to node B, and $D_{BA}$ the signal transit time from node B to node A, $\Delta T_B$ is the measured difference at node B, and $\Delta T_A$ is the measured difference at node A;

(5) — combining the measured but uncorrected error in each neighboring node's clock with the difference between the local clock and the clock at each neighboring node as obtained by step (4) to determine a set of measurements of the error in the local clock based on information from each neighboring node;

(6) — combining the estimated time inaccuracy for each neighboring node with the estimated inaccuracy of the path between the neighboring node and the local node as assigned during network design whereby the resulting set of inaccuracies are the inaccuracies for the timing information received from each neighboring node;

(7) — selecting from among the set of error measurements for the local clock as determined by step (5) and the associated inaccuracies as determined by step (6) only the ones for neighbors with fewer links between themselves and the ultimate master than the local node has between itself and the ultimate master and combining these error measurements and their associated inaccuracies according to the following equation to evaluate the error in the local clock based upon this particular class of neighbors:

$$E = \frac{\frac{X_1}{\sigma_1^2} + \frac{X_2}{\sigma_2^2} + \cdots + \frac{X_n}{\sigma_n^2}}{\frac{1}{\sigma_1^2} + \frac{1}{\sigma_2^2} + \cdots + \frac{1}{\sigma_n^2}}$$

where E is the error in the local clock, $X_1, X_2, \ldots, X_n$ are the error measurements determined by step (5), $\sigma_1^2, \sigma_2^2, \ldots, \sigma_n^2$ are the inaccuracies as determined by step (6); and transmitting the resulting error, E, evaluated for the local clock to all neighbors of the local node;

(8) — selecting from among the set of inaccuracies as determined by step (6) only the ones for neighbors with fewer links between themselves and the ultimate master than the local node has between itself and the ultimate master and combining them according to the following equation to evaluate the inaccuracy of the error measurement for the local clock based on this particular set of neighbors:

$$\sigma_t^2 = \frac{1}{\frac{1}{\sigma_1^2} + \frac{1}{\sigma_2^2} + \cdots + \frac{1}{\sigma_n^2}}$$

and transmitting this information from the local node to all neighbors.

18. The method according to claim 17, comprising the further step of:

(9) — assigning a very high inaccuracy to a transmission link if there is a failure of that transmission link or of the time transfer over that transmission link, for use where its inaccuracy is applied in steps (6) and (7) and optionally assigning a low rank to the neighboring node connected to the local node by the particular transmission link such that when this high inaccuracy is applied to the equations of steps (7) and (8), it results in this link having a negligible contribution to the timing function, the local node temporarily referencing its own clock while nodal timing is being reorganized using steps (2) and (3) if the transmission link that failed was the only link from the local node to a neighboring node having fewer links between itself and the ultimate master than the local node has between itself and the ultimate master.

19. The method according to claim 18, comprising the further step of:

(10) — assigning a very low rank to a node and optionally assigning very high variances to all links connected to the node if there is a failure of the nodal clock.

20. The method of claim 17, in which step (5) provides a set of error measurements for the local clock based on information from each neighboring node while step (6) provides a corresponding set of inaccuracies for these error measurements, step (7) provides a combined measurement for the error in the local clock and step (8) provides a corresponding inaccuracy for the combined measurement; the system further using the following step by each node in employing the information items (1)-(5) to provide the desired time reference distribution:

(11) subtracting the combined measurement as determined by step (7) from each member of the set determined by step (5) whereby the resulting set gives the difference between each individual measurement and the combined measurement, adding the inaccuracy determined by step (8) to each member of the set of inaccuracies obtained by step (6) and taking the square root to obtain a set of estimates of the standard deviations of the clock error measurements based on information from each neighbor relative to the combined clock error measurement with each member of the set of differences between individual measurements and dividing the combined measurement by the corresponding standard deviation to obtain a normalized set of ratios, whereby a lowest level alarm would be activated when the ratio reaches 2, a second level alarm would be activated when the ratio reaches 3, a third level alarm would be activated when the ratio reaches 4, and a fourth level alarm would be activated when the ratio reaches 5.

21. A time reference distribution method for an electronic network having a multiplicity of nodes, connected by transmission links, each node having a local clock with a unique rank, wherein the time reference from the highest ranking clock is distributed through said transmission lines to all nodes of the network; the network including means whereby the network is reorganized to accommodate failures, wherein different classes of information are supplied to different classes of neighboring nodes, i.e., neighboring nodes are separated into four classes, namely, Class A neighboring nodes which include all neighboring nodes using the highest ranking ultimate reference and which have fewer links between themselves and the ultimate reference than the local node has between itself and the ultimate reference, Class B neighboring nodes which include all those neighboring nodes using the highest ranking ultimate reference and which have no more links between themselves and the ultimate reference than the local node has between itself and the ultimate reference, whereby the Class B neighbors have the Class A neighbors as a subset, Class C neighboring nodes which include all those neighboring nodes using the highest ranking ultimate reference and which have more links between themselves and the ultimate reference than the local node has between itself and the ultimate reference, and Class D neighboring nodes which include all those neighboring nodes not using the highest ranking ultimate reference; each node transmitting to its immediate neighbors the following information:

(1) the rank of the clock used as the master time reference for the local clock;

(2) the number of links between the local node and its master time reference;

(3) the time difference between the local clock and the clock at the other end of the link as observed at the local clock, which includes signal transit time from one node to the other;

(4A) measured but uncorrected error in the local clock based on information from Class A neighbors;

(4B) measured but uncorrected error in the local clock based on information from Class B neighbors;

(5A) estimated inaccuracy of the measured error in the local clock based on information from Class A neighbors;

(5B) estimated inaccuracy of the measured error in the local clock based on information from Class B neighbors;

wherein information items (4A) and (5A) are based only on information received from Class A neighbors and this information is transmitted to Class B neighbors; information items (4B) and (5B) are based on information from Class B neighbors and this information is transmitted only to Class C neighbors;

wherein each local node employs information items (1)-(5B) as received from neighboring nodes to provide the desired time reference distribution, according to the following steps:

(1) — a node initially entering the network using its own clock as its time reference until a better reference can be determined and supplying the rank of its own clock to its neighbors, and the node reverting to its own clock whenever no better reference is available;

(2) — providing each node with the rank of the clock which is used as the ultimate time reference by each of its neighbors, each node selecting from among its neighbors the node or nodes using the highest ranking clock as the ultimate time reference for use in measuring the error in its own clock, with the local node supplying to all its neighbors the rank of this ultimate time reference used by the selected neighbors, unless the local clock has a higher rank, in which event the local clock is used as the ultimate reference and the local node supplies to all neighbors of the local node the local clock's rank;

(3) — providing each node with information about the number of links between each neighboring node and that neighbor's ultimate reference with the number of links between the local node and the ultimate time reference being greater by one than the number for the neighbor or neighbors selected by step (2) which have the least number of links between themselves and the ultimate reference, unless the local node is referencing its own clock in which event the number of links between itself and the ultimate reference is zero, the local node transmitting the evaluation of the number of links between the local node and its ultimate reference to all its neighbors and assigning each neighboring node to the appropriate one or more of classes A, B, C, and D;

(4) — determining the time difference between the local clock and the clock at each neighboring node with the transit time removed to provide a measurement of the actual time difference (no transit time included) between the local clock and the clock at each neighboring node according to the following equation:

$$T_B - T_A = \frac{\Delta T_B - \Delta T_A}{2} + \frac{D_{BA} - D_{AB}}{2}$$

where $\Delta T_A$ is the time difference measured at node A and $\Delta T_B$ is the time difference measured at node B and where $T_A$ is the time of the clock at node A, $T_B$ is the time of the clock at node B, $D_{AB}$ is the signal transit time from node A to node B, and $D_{BA}$ the signal transit time from node B to node A;

(5) — transmitting information item (4A) to the local node from each neighboring node for which the local node is a class B neighbor while transmitting information item (4B) to the local node from each neighboring node for which the local node is a Class C neighbor, combining this information, which gives the measured but uncorrected error for the neighboring node, with the difference between the local clock and each neighboring clock as determined by step (4) to provide a result which is a set of error measurements for the local clock as determined by information received from each neighbor;

(6) — transmitting information item (5A) to the local node from each neighboring node for which the local node is a Class B neighbor, while transmitting information item (5B) to the local node from each neighboring node for which the local node is a Class C neighbor, combining this information, which is the estimated inaccuracy of the measured but uncorrected error associated with each neighboring node, with the estimated inaccuracy of the link between that neighbor and the local node as determined during engineering design such that the result is a set of inaccuracies for the measured error in the clock at the local node based on information from each neighbor with the estimated inaccuracy between a neighbor and the local node as established during engineering design;

(7) — selecting from the set of error measurements for the local clock as determined by step (5) and the associated inaccuracies determined by step (6) only those for Class A neighbors and combining these error measurements according to the following equation to evaluate the error in the local clock based on Class A neighbors, and transmitting this information to Class B neighbors as information item (4A) and using this information at the local node for any clock corrections that are made:

$$E = \frac{\frac{X_1}{\sigma_1^2} + \frac{X_2}{\sigma_2^2} + \cdots + \frac{X_n}{\sigma_n^2}}{\frac{1}{\sigma_1^2} + \frac{1}{\sigma_2^2} + \cdots + \frac{1}{\sigma_n^2}}$$

where E is the error in the local clock, $X_1, X_2, \ldots, X_n$ represent the error measurements determined by step (5), and $\sigma_1^2, \sigma_2^2, \ldots, \sigma_n^2$ are the inaccuracies as determined by step (6);

(8) — selecting from the set of inaccuracies determined by step (6) only the ones for Class A neighbors and combining them according to the following equation to determine an estimate of the inaccuracy of the measured error for the local clock based on Class A neighbors, transmitting this information to Class B neighbors as information item (5A), and using this information at the local node:

$$\sigma_t^2 = \frac{1}{\frac{1}{\sigma_1^2} + \frac{1}{\sigma_2^2} + \cdots + \frac{1}{\sigma_n^2}}$$

(9) — combining the set of error measurements from all Class B neighbors using the equation of step (7) with the set of error measurements used in that equation determined by step (5) and the set of associated inaccuracies determined by step (6), to determine the local clock error, and transmitting the resulting estimate of the error in the local clock to all Class C neighbors as information item (4B); and

(10) — combining the set of inaccuracies for all Class B neighbors as determined by step (6) using the equation of step (8) into an estimate for inaccuracy of the measured error in the local clock and transmitting this inaccuracy information to all Class C neighbors as information item (5B).

22. The method of claim 21, in which step (5) provides a set of error measurements for the local clock based on information from each neighboring node while step (6) provides a corresponding set of inaccuracies for these error measurements, step (9) provides a combined measurement for the error in the local clock and step (10) provides a corresponding inaccuracy for the combined measurement; the system further using the following step by each node in employing the information items (1)–(5B) to provide the desired time reference distribution:

(11) subtracting the combined measurement as determined by step (9) from each member of the set determined by step (5) whereby the resulting set gives the difference between each individual measurement and the combined measurement, adding the inaccuracy determined by step (10) to each member of the set of inaccuracies obtained by step (6) and taking the square root to obtain a set of estimates of the standard deviations of the clock error measurements based on information from each neighbor relative to the combined clock error measurement with each member of the set of differences between the combined measurement and the individual measurements being divided by the corresponding standard deviations to obtain a normalized set of ratios, whereby a lowest level alarm would be activated when the ratio reaches 2, a second level alarm would be activated when the ratio reaches 3, a third level alarm would be activated when the ratio reaches 4, and a fourth level alarm would be activated when the ratio reaches 5.

23. The method according to claim 22, comprising the further step of:

(12) — assigning a very high inaccuracy to a transmission link if there is a failure of that transmission link or of the time transfer over that transmission link, for use where its inaccuracy is applied in steps (6) and (7) and optionally assigning a low rank to the neighboring node connected to the local node by the particular transmission link such that when this high inaccuracy is applied to the equations of steps (7) and (8), it results in this link having a negligible contribution to the timing function, the local node temporarily referencing its own clock while nodal timing is being reorganized using steps (2) and (3) if the transmission link that failed was the only link from the local node to a neighboring node having fewer links between itself and the ultimate master than the local node has between itself and the ultimate masters.

24. The method according to claim 23, comprising the further step of:

(13) — assigning a very low rank to a node and optionally assigning very high variances to all links connected to the node if there is a failure of the nodal clock.

25. A time reference distribution system for an electronic network having a multiplicity of nodes, connected by transmission links, each node having a local clock with a unique rank, wherein the time reference from the highest ranking clock is distributed through said transmission lines to all nodes of the network; including means whereby the network is reorganized to accommodate failures, wherein different classes of information are supplied to different classes of neighboring nodes, i.e., neighboring nodes are separated into four classes, namely, Class A neighboring nodes which include all neighboring nodes using the highest ranking ultimate reference and which have fewer links between themselves and the ultimate reference than the local node has between itself and the ultimate reference, Class B neighboring nodes which include all those neighboring nodes using the highest ranking ultimate reference and which have no more links between themselves and the ultimate reference than the local node has between itself and the ultimate reference, whereby the Class B neighbors have the Class A neighbors as a subset, Class C neighboring nodes which include all those neighboring nodes using the highest ranking ultimate reference and which have more links between themselves and the ultimate reference than the local node has between itself and the ultimate reference, and Class D neighboring nodes which include all those neighboring nodes not using the highest ranking ultimate reference; each node having means for transmitting to its immediate neighbors the following information:

(1) the rank of the clock used as the master time reference for the local clock;

(2) the number of links between the local node and its master time reference;

(3) the time difference between the local clock and the clock at the other end of the link as observed at the local clock, which includes signal transit time from one node to the other;

(4A) measured but uncorrected error in the local clock based on information from Class A neighbors;

(4B) measured but uncorrected error in the local clock based on information from Class B neighbors;

(5A) estimated inaccuracy of the measured error in the local clock based on information from Class A neighbors;

(5B) estimated inaccuracy of the measured error in the local clock based on information from Class B neighbors;

wherein information items (4A) and (5A) are based only on information received from Class A neighbors and this information is transmitted to Class B neighbors; information items (4B) and (5B) are based on information from Class B neighbors and this information is transmitted only to Class C neighbors; each node further comprising means for employing information items (1)–(5B) as received from neighboring nodes to provide the desired time reference distribution, according to the following set of rules:

Rule 1 — a node initially entering the network will use its own clock as its time reference until a better reference can be determined and will supply the rank of its own clock to its neighbors, and the node will revert to its own clock whenever no better reference is available;

Rule 2 — each node is provided with the rank of the clock which is used as the ultimate time reference by each of its neighbors, and for use in determining its own reference, i.e., measuring the error in its own clock, a node will select from among its neighbors the node or nodes using the highest ranking clock as the ultimate time reference with the rank of this ultimate time reference used by the selected neighbors supplied to all neighbors of the local node, unless the local clock has a higher rank, in which event the local clock is used as the ultimate reference and the local clock's rank is supplied to all neighbors of the local node;

Rule 3 — each node is provided with information about the number of links between each neighboring node and that neighbor's ultimate reference with the number of links between the local node and the ultimate time reference being greater by one than the number for the neighbor or neighbors selected by Rule 2 which have the least number of links between themselves and the ultimate reference, unless the local node is referencing its own clock in which event the number of links between itself and the ultimate reference is zero, which evaluation of the number of links between the local node and its ultimate reference is supplied to all neighbors and, each neighboring node is assigned to the appropriate one or more of classes A, B, C, and D;

Rule 4 — the time difference between the local clock and the clock at each neighboring node (including the signal transit time between nodes) as measured at the neighboring node is used to determine the time difference between the two clocks with the transit time removed so as to provide a measurement of the actual time difference (no transit time included) between the local clock and the clock at each neighboring node according to the following equation:

$$T_B - T_A = \frac{\Delta T_B - \Delta T_A}{2} + \frac{D_{BA} - D_{AB}}{2}$$

where $\Delta T_A$ is the time difference measured at node A and $\Delta T_B$ is the time difference measured at node B and where $T_A$ is the time of the clock at node A, $T_B$ is the time of the clock at node B, $D_{AB}$ is the signal transit time from node A to node B, and $D_{BA}$ the signal transit time from node B to node A;

Rule 5 — each neighboring node for which the local node is a Class B neighbor transmits information item (4A) to the local node while each neighboring node for which the local node is a Class C neighbor transmits information item (4B) to the local node such that this information, as received gives the measured but uncorrected error for the neighboring node which is added to the difference between the local clock and each neighboring clock as determined by Rule 4 to provide a result which is a set of error measurements for the local clock as determined by information received from each neighbor;

Rule 6 — each neighboring node for which the local node is a Class B neighbor transmits information item (5A) to the local node while each neighboring node for which the local node is a Class C neighbor transmits information item (5B) to the local node such that this information, as received is the estimated inaccuracy of the measured but uncorrected error associated with each neighboring node, which is added to the estimated inaccuracy of the link between that neighbor and the local node as determined during engineering design such that the result is a set of inaccuracies for the measured error in the clock at the local node based on information from each neighbor;

Rule 7 — select from the set of error measurements for the local clock as determined by Rule 5 and the associated inaccuracies determined by Rule 6 only those for Class A neighbors and combine these error measurements according to the following equation to evaluate the error in the local clock based on Class A neighbors, which information is provided to Class B neighbors as information item (4A):

$$E = \frac{\frac{X_1}{\sigma_1^2} + \frac{X_2}{\sigma_2^2} + \ldots + \frac{X_n}{\sigma_n^2}}{\frac{1}{\sigma_1^2} + \frac{1}{\sigma_2^2} + \ldots + \frac{1}{\sigma_n^2}}$$

where E is the error in the local clock, $X_1, X_2, \ldots, X_n$ represent the error measurements determined by Rule 5, and $\sigma_1^2, \sigma_2^2, \ldots, \sigma_n^2$ are the inaccuracies as determined by Rule 6;

Rule 8 — select from the set of inaccuracies determined by Rule 6 only the ones for Class A neighbors and combine them according to the following equation to determine an estimate of the inaccuracy of the measured error for the local clock based on Class A neighbors which information is provided to Class B neighbors as information item (5A) and it can also be used at the local node:

$$\sigma_t^2 = \frac{1}{\frac{1}{\sigma_1^2} + \frac{1}{\sigma_2^2} + \ldots + \frac{1}{\sigma_n^2}}$$

Rule 9 — use the equation of Rule 7 to combine the set of error measurements from all Class B neighbors in a determination of the local clock error with the set of error measurements used in that equation determined by Rule 5 and the set of associated inaccuracies determined by Rule 6, and provide the resulting estimate of the error in the local clock to all Class C neighbors as information item (4B) and it is also used for clock corrections at the local node;

Rule 10 — use the equation of Rule 8 to combine the set of inaccuracies for all Class B neighbors as determined by Rule 6 into an estimate for inaccuracy of the measured error in the local clock and provide this inaccuracy information to all Class C neighbors as information item (5B).

26. A time reference distribution method for an electronic network having a multiplicity of nodes, connected by transmission links, each node having a local clock with a unique rank, wherein the time reference from the highest ranking clock is distributed through said transmission lines to all nodes of the network; the network including means whereby the network is reorganized to accommodate failures, wherein different classes of information are supplied to different classes of neighboring nodes, i.e., neighboring nodes are separated into four classes, namely, Class A neighboring nodes which include all neighboring nodes using the highest ranking ultimate reference and which have fewer links between themselves and the ultimate reference than the local node has between itself and the ultimate reference, Class B neighboring nodes which include all those neighboring nodes using the highest ranking ultimate reference and which have no more links between themselves and the ultimate reference than the local node has between itself and the ultimate reference, whereby the Class B neighbors have the Class A neighbors as a subset, Class C neighboring nodes which include all those neighboring nodes using the highest ranking ultimate reference and which have more links between themselves and the ultimate reference than the local node has between itself and the ultimate reference, and Class D neighboring nodes which include all those neighboring nodes not using the highest ranking ultimate reference; each node transmitting to its immediate neighbors the following information:

(1) the rank of the clock used as the master time reference for the local clock;

(2) the number of links between the local node and its master time reference;

(3) the time difference between the local clock and the clock at the other end of the link as observed at the local clock, which includes signal transit time from one node to the other;

(4A) measured but uncorrected error in the local clock based on information from Class A neighbors;

(4B) measured but uncorrected error in the local clock based on information from Class B neighbors;

(5A) estimated inaccuracy of the measured error in the local clock based on information from Class A neighbors;

(5B) estimated inaccuracy of the measured error in the local clock based on information from Class B neighbors;

wherein information items (4A) and (5A) are based only on information received from Class A neighbors and this information is transmitted to Class B neighbors; information items (4B) and (5B) are based on information from Class B neighbors and this information is transmitted only to Class C neighbors;

wherein each local node employs information items (1)-(5B) as received from neighboring nodes to provide the desired time reference distribution, according to the following steps:

(1) — a node initially entering the network using its own clock as its time reference until a better reference can be determined and supplying the rank of its own clock to its neighbors, and the node reverting to its own clock whenever no better reference is available;

(2) — providing each node with the rank of the clock which is used as the ultimate time reference by each of its neighbors, each node selecting from among its neighbors the node or nodes using the highest ranking clock as the ultimate time reference for use in measuring the error in its own clock, with the local node supplying to all its neighbors the rank of this ultimate time reference used by the selected neighbors, unless the local clock has a higher rank, in which event the local clock is used as the ultimate reference and the local node supplies to all neighbors of the local node the local clock's rank;

(3) — providing each node with information about the number of links between each neighboring node and that neighbor's ultimate reference with the number of links between the local node and the ultimate time reference being greater by one than the number for the neighbor or neighbors selected by step (2) which have the least number of links between themselves and the ultimate reference, unless the local node is referencing its own clock in which event the number of links between itself and the ultimate reference is zero, the local node transmitting the evaluation of the number of links between the local node and its ultimate reference to all its neighbors and assigning each neighboring node to the appropriate one or more of classes A, B, C, and D;

(4) — determining the time difference between the local clock and the clock at each neighboring node with the transit time removed to provide a measurement of the actual time difference (no transit time included) between the local clock and the clock at each neighboring node according to the following equation:

$$T_B - T_A + \frac{\Delta T_B - \Delta T_A}{2} + \frac{D_{BA} - D_{AB}}{2}$$

where $\Delta T_A$ is the time difference measured at node A and $\Delta T_B$ is the time difference measured at node B and where $T_A$ is the time of the clock at node A, $T_B$ is the time of the clock at node B, $D_{AB}$ is the signal transit time from node A to node B, and $D_{BA}$ the signal transit time from node B to node A;

(5) — transmitting information item (4A) to the local node from each neighboring node for which the local node is a Class B neighbor while transmitting information item (4B) to the local node from each neighboring node for which the local node is a Class C neighbor, combining this information, which gives the measured but uncorrected error for the neighboring node, with the difference between the local clock and each neighboring clock as determined by step (4) to provide a result which is a set of error measurements for the local clock as determined by information received from each neighbor;

(6) — transmitting information item (5A) to the local node from each neighboring node for which the local node is a Class B neighbor, while transmitting information item (5B) to the local node from each neighboring node for which the local node is a Class C neighbor, combining this information, which is the estimated inaccuracy of the measured but uncorrected error associated with each neighboring node, with the estimated inaccuracy of the link between that neighbor and the local node as determined during engineering design such that the result is a set of inaccuracies for the measured error in the clock at the local node based on information from each neighbor with the estimated inaccuracy between a neighbor and the local node as established during engineering design;

(7) — selecting from the set of error measurements for the local clock as determined by step (5) and the associated inaccuracies determined by step (6) only those for Class A neighbors and combining these error measurements according to the following equation to evaluate the error in the local clock based on Class A neighbors, and transmitting this information to Class B neighbors as information item (4A):

$$E = \frac{\frac{X_1}{\sigma_1^2} + \frac{X_2}{\sigma_2^2} + \ldots + \frac{X_n}{\sigma_n^2}}{\frac{1}{\sigma_1^2} + \frac{1}{\sigma_2^2} + \ldots + \frac{1}{\sigma_n^2}}$$

where E is the error in the local clock, $X_1, X_2, \ldots, X_n$ represent the error measurements determined by step (5), and $\sigma_1^2, \sigma_2^2, \ldots, \sigma_n^2$ are the inaccuracies as determined by step (6);

(8) — selecting from the set of inaccuracies determined by step (6) only the ones for Class A neighbors and combining them according to the following equation to determine an estimate of the inaccuracy of the measured error for the local clock based on Class A neighbors, transmitting this information to Class B neighbors as information item (5A):

$$\sigma_t^2 = \frac{1}{\frac{1}{\sigma_1^2} + \frac{1}{\sigma_2^2} + \ldots + \frac{1}{\sigma_n^2}}$$

(9) — combining the set of error measurements from all Class B neighbors using the equation of step (7) with the set of error measurements used in that equation determined by step (5) and the set of associated inaccuracies determined by step (6), to determine the local clock error, and transmitting the resulting estimate of the error in the local clock to all Class C neighbors as information item (4B) and using this information at the local node for any clock corrections that are made; and

(10) — combining the set of inaccuracies for all Class B neighbors as determined by step (6) using the equation of step (8) into an estimate for inaccuracy of the measured error in the local clock and transmitting this inaccuracy information to all Class C neighbors as information item (5B) and using this information at the local node.

* * * * *